United States Patent
Kurosawa

(12) 
(10) Patent No.: US 11,403,363 B2
(45) Date of Patent: Aug. 2, 2022

(54) SEARCH SYSTEM, METHOD, AND PROGRAM FOR RESTRICTING RESULTS BASED ON CONFLICTS

(71) Applicant: Rakuten Group, Inc., Tokyo (JP)

(72) Inventor: Takayuki Kurosawa, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 16/497,995

(22) PCT Filed: Mar. 29, 2018

(86) PCT No.: PCT/JP2018/013285
§ 371 (c)(1),
(2) Date: Sep. 26, 2019

(87) PCT Pub. No.: WO2019/186908
PCT Pub. Date: Oct. 3, 2019

(65) Prior Publication Data
US 2020/0065349 A1 Feb. 27, 2020

(51) Int. Cl.
| | |
|---|---|
| *G06F 16/9535* | (2019.01) |
| *G06F 16/957* | (2019.01) |
| *G06F 16/9035* | (2019.01) |
| *G06F 16/9538* | (2019.01) |
| *G06F 3/0482* | (2013.01) |

(52) U.S. Cl.
CPC ........ *G06F 16/9577* (2019.01); *G06F 3/0482* (2013.01); *G06F 16/9035* (2019.01); *G06F 16/9535* (2019.01); *G06F 16/9538* (2019.01)

(58) Field of Classification Search
CPC ............. G06F 16/9577; G06F 16/9035; G06F 16/9535; G06F 16/9538; G06F 3/0482
See application file for complete search history.

(56) References Cited

U.S. PATENT DOCUMENTS

| | | | |
|---|---|---|---|
| 8,396,760 B1 * | 3/2013 | Bradley ................. G06Q 30/06 705/26.7 |
| 9,965,794 B1 * | 5/2018 | Brazil ................ G06Q 30/0633 |
| 10,783,460 B1 * | 9/2020 | Davis .................... G06Q 10/025 |
| 2008/0027967 A1 | 1/2008 | Garbow et al. |
| 2012/0136682 A1 | 5/2012 | Harris |
| 2012/0316985 A1 * | 12/2012 | Wilkinson ............. G01B 21/20 705/26.7 |
| 2013/0124564 A1 | 5/2013 | Oztekin et al. |

(Continued)

FOREIGN PATENT DOCUMENTS

JP 2016-139931 A 8/2016

*Primary Examiner* — Beau D Spratt
(74) *Attorney, Agent, or Firm* — Sughrue Mion, PLLC

(57) ABSTRACT

To increase convenience of a user interface, a search system (S) is a search system for a reservable or purchasable item. Search means (201) executes an item search based on a search condition input by a user. Viewing means (202) enables the user to view an item selected by the user from among search results obtained by the search means (201). Associating means (203) records in storage means (200) the viewed item and the search condition used in the search in association with each other. Display control means (204) controls, when an item is reserved or purchased by the user, display of the viewed item based on content information on reservation content or purchase content and based on the search condition associated with the viewed item.

14 Claims, 25 Drawing Sheets

(56) References Cited

U.S. PATENT DOCUMENTS

2013/0290324 A1* 10/2013 Gibergues ............ G06F 16/9535
    707/731
2013/0339163 A1* 12/2013 Dumontet .......... G06Q 30/0631
    705/15
2014/0279261 A1* 9/2014 Krishna Kolluri ....... G06T 7/11
    705/26.63
2016/0335691 A1* 11/2016 Hirai .................. G06F 16/24578
2017/0039619 A1   2/2017 Barraud et al.
2017/0372396 A1* 12/2017 Jones ................. G06Q 30/0601
2018/0130149 A1   5/2018 Cheng et al.

* cited by examiner

| HOTEL ID | HOTEL INFORMATION ||| ROOM INFORMATION |||
|---|---|---|---|---|---|---|
| | HOTEL NAME | ADDRESS | CONTACT INFORMATION | ROOM ID | ROOM NAME | NUMBER OF PEOPLE WHO CAN USE ROOM |
| h00001 | HOTEL A | ..., TOKYO | 03-XXXX-XXXX | r10001 | STANDARD ROOM | 2 |
| | | | | r10002 | SUPERIOR ROOM | 2 |
| | | | | r10003 | SUITE ROOM | 6 |
| | | | | ... | ... | ... |
| h00002 | HOTEL B | ..., TOKYO | 03-YYYY-YYYY | r20001 | SINGLE ROOM | 1 |
| | | | | r20002 | DOUBLE ROOM | 2 |
| | | | | r20003 | TWIN ROOM | 2 |
| | | | | ... | ... | ... |
| h00003 | HOTEL C | ..., TOKYO | 03-ZZZZ-ZZZZ | r30001 | STANDARD TWIN | 2 |
| | | | | r30002 | SUPERIOR TWIN | 2 |
| | | | | r30003 | JUNIOR SUITE | 5 |
| | | | | ... | ... | ... |
| ... | ... | ... | ... | | | |

| HOTEL ID | ROOM INFORMATION | DATE OF USE | STOCK INFORMATION |
|---|---|---|---|
| h00001 | r10001 | ⋮ | ⋮ |
| | | 2018/4/1 | 8 |
| | | 2018/4/2 | 6 |
| | | 2018/4/3 | 2 |
| | | ⋮ | ⋮ |
| | r10002 | ⋮ | ⋮ |
| | | 2018/4/1 | 15 |
| | | 2018/4/2 | 0 |
| | | 2018/4/3 | 7 |
| | | ⋮ | ⋮ |
| | r10003 | ⋮ | ⋮ |
| | | 2018/4/1 | 9 |
| | | 2018/4/2 | 4 |
| | | 2018/4/3 | 3 |
| | | ⋮ | ⋮ |
| | ⋮ | ⋮ | ⋮ |
| h00002 | r20001 | ⋮ | ⋮ |
| | | 2018/4/1 | 16 |
| | | 2018/4/2 | 4 |
| | | 2018/4/3 | 6 |
| | | ⋮ | ⋮ |
| | r20002 | ⋮ | ⋮ |
| | | 2018/4/1 | 14 |
| | | 2018/4/2 | 5 |
| | | 2018/4/3 | 4 |
| | | ⋮ | ⋮ |
| | r20003 | ⋮ | ⋮ |
| | | 2018/4/1 | 13 |
| | | 2018/4/2 | 7 |
| | | 2018/4/3 | 3 |
| | | ⋮ | ⋮ |
| | ⋮ | ⋮ | ⋮ |
| ⋮ | ⋮ | ⋮ | ⋮ |

| USER ID | No | HOTEL ID | SEARCH CONDITIONS | VIEWING TIME |
|---|---|---|---|---|
| u00001 | 1 | h00005 | TOKYO 2018/4/1-2018/4/3 2 PEOPLE | 2018/3/22 20:15:12 |
| | 2 | h00004 | TOKYO 2018/4/1-2018/4/3 2 PEOPLE | 2018/3/22 20:14:01 |
| | 3 | h00003 | TOKYO 2018/4/1-2018/4/3 2 PEOPLE | 2018/3/22 20:12:32 |
| | ... | ... | ... | ... |
| u00002 | 1 | h00012 | OSAKA 2018/3/28-2018/3/29 1 PERSON | 2018/3/24 11:21:54 |
| | 2 | h00021 | OSAKA 2018/3/28-2018/3/29 1 PERSON | 2018/3/24 11:18:12 |
| | 3 | h00018 | OSAKA 2018/3/28-2018/3/29 1 PERSON | 2018/3/24 11:16:42 |
| | ... | ... | ... | ... |
| u00003 | 1 | h00005 | KYOTO 2018/4/5-2018/4/10 3 PEOPLE | 2018/3/23 22:32:25 |
| | 2 | h00004 | OKINAWA 2018/4/5-2018/4/10 3 PEOPLE | 2018/3/23 22:30:19 |
| | 3 | h00003 | OKINAWA 2018/4/5-2018/4/10 3 PEOPLE | 2018/3/23 22:28:27 |
| | ... | ... | ... | ... |
| ... | | | | |

FIG. 15

| USER ID | No | HOTEL ID | SEARCH CONDITIONS | VIEWING TIME | NON-DISPLAY FLAG |
|---|---|---|---|---|---|
| u00001 | 1 | h00007 | TOKYO 2018/4/1-2018/4/3 2 PEOPLE | 2018/3/22 20:15:12 | 1 |
| | 2 | h00008 | TOKYO 2018/4/1-2018/4/3 2 PEOPLE | 2018/3/22 20:14:01 | 1 |
| | 3 | h00009 | TOKYO 2018/4/1-2018/4/3 2 PEOPLE | 2018/3/22 20:12:32 | 1 |
| | 4 | h00010 | NEW YORK 2018/5/15-2018/5/18 4 PEOPLE | 2018/3/18 15:25:51 | 0 |
| | 5 | h00011 | NEW YORK 2018/5/15-2018/5/18 4 PEOPLE | 2018/3/18 15:22:18 | 0 |
| | 6 | h00012 | NEW YORK 2018/5/15-2018/5/18 4 PEOPLE | 2018/3/18 15:18:43 | 0 |
| | ... | ... | ... | ... | ... |
| ... | | | | | |

| USER ID | RESERVATION INFORMATION | | | | RESERVATION COMPLETION DATE AND TIME |
|---|---|---|---|---|---|
| | HOTEL ID | ROOM ID | DATE OF USE | NUMBER OF USERS | |
| u00001 | h00007 | r70001 | 2018/4/1-2018/4/3 | 2 | 2018/3/22 21:17:43 |
| u00002 | h00015 | r15001 | 2018/3/27-2018/3/28 | 1 | 2018/3/21 14:31:55 |
| u00003 | h00021 | r21001 | 2018/4/2-2018/4/7 | 4 | 2018/3/22 08:12:31 |
| ... | ... | ... | ... | ... | ... |

SEARCH SYSTEM, METHOD, AND PROGRAM FOR RESTRICTING RESULTS BASED ON CONFLICTS

CROSS REFERENCE TO RELATED APPLICATIONS

This application is a National Stage of International Application No. PCT/JP2018/013285 filed Mar. 29, 2018.

TECHNICAL FIELD

The present invention relates to a search system, a search method, and a program.

BACKGROUND ART

Hitherto, there has been known a technology for searching an item. For example, in Patent Literature 1, there is disclosed a reservation system for hotels, which are an example of an item, in which hotels are searched based on a search condition such as a date of use, a number of users, and a place of stay input by a user, and a history of the hotels viewed by the user is recorded as a viewing history.

CITATION LIST

Patent Literature

[PTL 1] JP 2016-139931 A

SUMMARY OF INVENTION

Technical Problem

In such a reservation system as that of Patent Literature 1, there is also a system for displaying a viewing history list showing the history of the hotels viewed by the user. However, in such a system, even when the reservation for the hotel is complete, other hotels that are compared at the time of the search remain being displayed in the viewing history list. These other hotels are searched by the same search condition as the reserved hotel and these other hotels may be unnecessary information. In the viewing history list of Patent Literature 1, hence such unnecessary information remains, which is not a highly convenient user interface.

The present invention has been made in view of the above-mentioned problem. It is an object of the present invention to provide a search system, a search method, and a program, which are capable of enhancing convenience of a user interface.

Solution to Problem

In order to solve the above-mentioned problems, a search system according to one embodiment of the present invention is a search system for a reservable or purchasable item, and includes: search means for executing an item search based on a search condition input by a user; viewing means for viewing an item selected by the user from among search results obtained by the search means; associating means for recording in storage means the viewed item and the search condition used in the search in association with each other; and display control means for controlling, when an item is reserved or purchased by the user, display of the viewed item based on content information on reservation content or purchase content and based on the search condition associated with the viewed item.

A search method according to one embodiment of the present invention is a search method for a reservable or purchasable item, and includes: a search step of executing an item search based on a search condition input by a user; a viewing step of viewing an item selected by the user from among search results obtained in the search step; an associating step of recording in storage means the viewed item and the search condition used in the search in association with each other; and a display control step of controlling, when an item is reserved or purchased by the user, display of the viewed item based on content information on reservation content or purchase content and based on the search condition associated with the viewed item.

A program according to one embodiment of the present invention causes a computer to function as: search means for executing an item search based on a search condition input by a user; viewing means for viewing an item selected by the user from among search results obtained by the search means; associating means for recording in storage means the viewed item and the search condition used in the search in association with each other; and display control means for controlling, when an item is reserved or purchased by the user, display of the viewed item based on content information on reservation content or purchase content and based on the search condition associated with the viewed item.

In one aspect of the present invention, the item reserved or purchased by the user is one viewed item, the content information is a search condition used in the search of the reserved or purchased viewed item, and the display control means is configured to control, based on a search condition associated with the reserved or purchased viewed item and based on a search condition associated with another viewed item, display of the another viewed item.

In one aspect of the present invention, the search condition includes a condition regarding each of a plurality of sub-items, the content information is information on, of the plurality of sub-items, at least one sub-item relating to the reservation content or purchase content, and the display control means is configured to perform display control based on the content information and based on the condition regarding the at least one sub-item included in the search condition associated with the viewed item.

In one aspect of the present invention, the display control means is configured to identify a viewed item that is unusable due to a relationship with the item reserved or purchased by the user, and perform display control of the identified viewed item.

In one aspect of the present invention, the search condition includes a condition relating to a date of use of an item, the content information indicates the date of use of the reserved or purchased item, and the display control means is configured to identify the unusable viewed item based on the date of use of the the reserved or purchased item and based on the date of use indicated by the search condition associated with the viewed item.

In one aspect of the present invention, the search system is configured to receive from a user terminal a display request for the viewed item, and the display control means is configured to execute, in advance, preparation processing for controlling display of the viewed item before the display request is received from the user terminal, and when the display request is received from the user terminal, perform display control based on an execution result of the preparation processing.

In one aspect of the present invention, the display control means is configured to restrict display of the viewed item when a search condition including content corresponding to the content information is associated with the viewed item.

In one aspect of the present invention, the display control means is configured to preferentially display the viewed item when a search condition including content corresponding to the content information is associated with the viewed item.

In one aspect of the present invention, the content information is information stored in a database for storing reservation content or purchase content specified by the user when an item is reserved or purchased by the user, and the display control means is configured to perform display control based on the content information stored in the database and based on the search condition associated with the viewed item.

In one aspect of the present invention, when a viewed item displayed by the display control means is selected by the user, the viewing means enables the viewed item to be viewed based on the search condition associated with the viewed item.

In one aspect of the present invention, the search condition includes a condition relating to a date of use of a service relating to an item, the content information indicates the date of use of the reserved or purchased item, the search system further includes elapse determination means for determining whether at least one of the date of use indicated by the search condition associated with the viewed item or the date of use of the reserved or purchased item has elapsed, and the display control means is configured to perform display control based further on a determination result obtained by the elapse determination means.

Advantageous Effects of Invention

According to the present invention, it is possible to enhance the convenience of the user interface.

BRIEF DESCRIPTION OF DRAWINGS

FIG. 7 is a table for showing a data storage example of an item database.

FIG. 8 is a table for showing a data storage example of a stock database.

FIG. 9 is a table for showing a data storage example of a viewing history database.

FIG. 15 is a table for showing a data storage example of a viewing history database of the second embodiment.

FIG. 16 is a table for showing a data storage example of a reservation database.

DESCRIPTION OF EMBODIMENTS

1. First Embodiment

There is now described a search system according to exemplary embodiments of the present invention.

1-1. Overall Configuration of Search System

Figure 1:
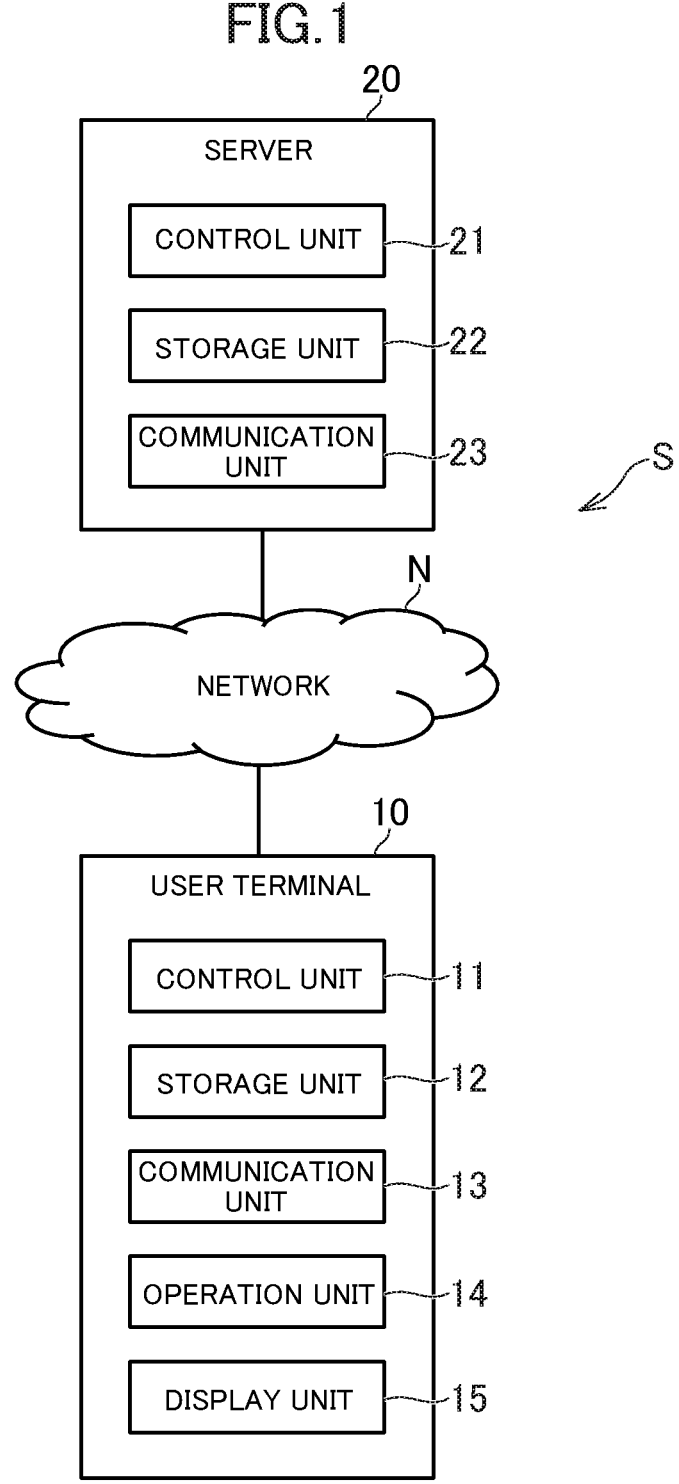
FIG. 1 is a diagram for illustrating an overall configuration of a search system.

FIG. 1 is a diagram for illustrating an overall configuration of the search system. As illustrated in FIG. 1, a search system S includes a user terminal 10 and a server 20, which are capable of being connected to a network N, for example, the Internet. In FIG. 1, one user terminal 10 and one server 20 are illustrated, but a plurality of user terminals 10 and a plurality of servers 20 may be arranged.

The user terminal 10 is a computer to be used by a user, and examples of the user terminal 10 include a cell phone (including a smartphone), a portable information terminal (including a tablet computer), and a personal computer. In the embodiments, the user terminal 10 includes a control unit 11, a storage unit 12, a communication unit 13, an operating unit 14, and a display unit 15.

The control unit 11 includes at least one microprocessor. The control unit 11 executes processing in accordance with programs and data stored in the storage unit 12. The storage unit 12 includes a main memory unit and an auxiliary memory unit. For example, the main memory unit is a volatile memory, for example, a RAM, and the auxiliary memory unit is a non-volatile memory such as a ROM, an EEPROM, a flash memory, or a hard disk drive.

The communication unit 13 is a communication interface for wired communication or wireless communication, and performs data communication via the network. The operating unit 14 is an input device to be used by the user for operation, and is, for example, a pointing device such as a touch panel and a mouse, a keyboard, or a button. The operating unit 14 transmits details of operation by the user to the control unit 11. The display unit 15 is, for example, a liquid crystal display unit or an organic EL display unit. The display unit 15 displays an image in accordance with an instruction of the control unit 11.

The server 20 is a server computer. The server 20 includes a control unit 21, a storage unit 22, and a communication unit 23. Physical configurations of the control unit 21, the storage unit 22, and the communication unit 23 may be the same as those of the control unit 11, the storage unit 12, and the communication unit 13, respectively.

Programs and data to be described as being stored into the storage units 12 and 22 may be supplied thereto via the network N. Further, the respective hardware configurations of the computers described above are not limited to the above-mentioned examples, and various types of hardware can be applied thereto. For example, the hardware configuration may include a reading unit (e.g., an optical disc drive or a memory card slot) configured to read a computer-readable information storage medium, or an input/output unit (e.g., a USB port) configured to input and output data to/from an external device. For example, the program and the data stored in the information storage medium may be supplied to each of the computers through intermediation of the reading unit or the input/output unit.

1-2. Outline of First Embodiment

In a first embodiment of the present invention, as an example, there is described a case in which the search system S is applied to a travel reservation service. The travel reservation service is a service for supporting a travel reservation by the user. In the first embodiment, as an example, there is described a travel reservation service for comprehensively supporting a reservation for an accommodation facility, an airline ticket, a rental car, a bus, and the like.

In the first embodiment, a hotel is described as an example of the accommodation facility, but the accommodation facility is not limited to a hotel, and may be an inn, a private accommodation facility, or a guest house. The content of the travel reservation service is not limited to that of the example described in the first embodiment, and for example, there may be supported a reservation for a train, a restaurant, or an optional tour, or there may be supported a reservation for a package tour combining a hotel, an airline ticket, and the like as a set. The reservation service is not limited to comprehensively supporting a plurality of reservations, and the travel reservation service may be a service for supporting anyone of the reservations. For example, the processing in the first embodiment can also be applied to a case in which only a hotel reservation or an airline ticket reservation is performed.

The search system S is also applicable to any situations other than a travel reservation, and may also be applied to various situations such as electronic commerce, ticket sales, or event reservations. Examples in which the search system S is applied in other situations are described in modification examples to be described later.

For example, when the user operates the user terminal 10 to access the server 20, a top screen of the travel reservation service is displayed on the display unit 15. The screen described below may be displayed as the screen of a travel reservation application stored in the user terminal 10, or may be shown as the screen of a web browser.

Figure 2:
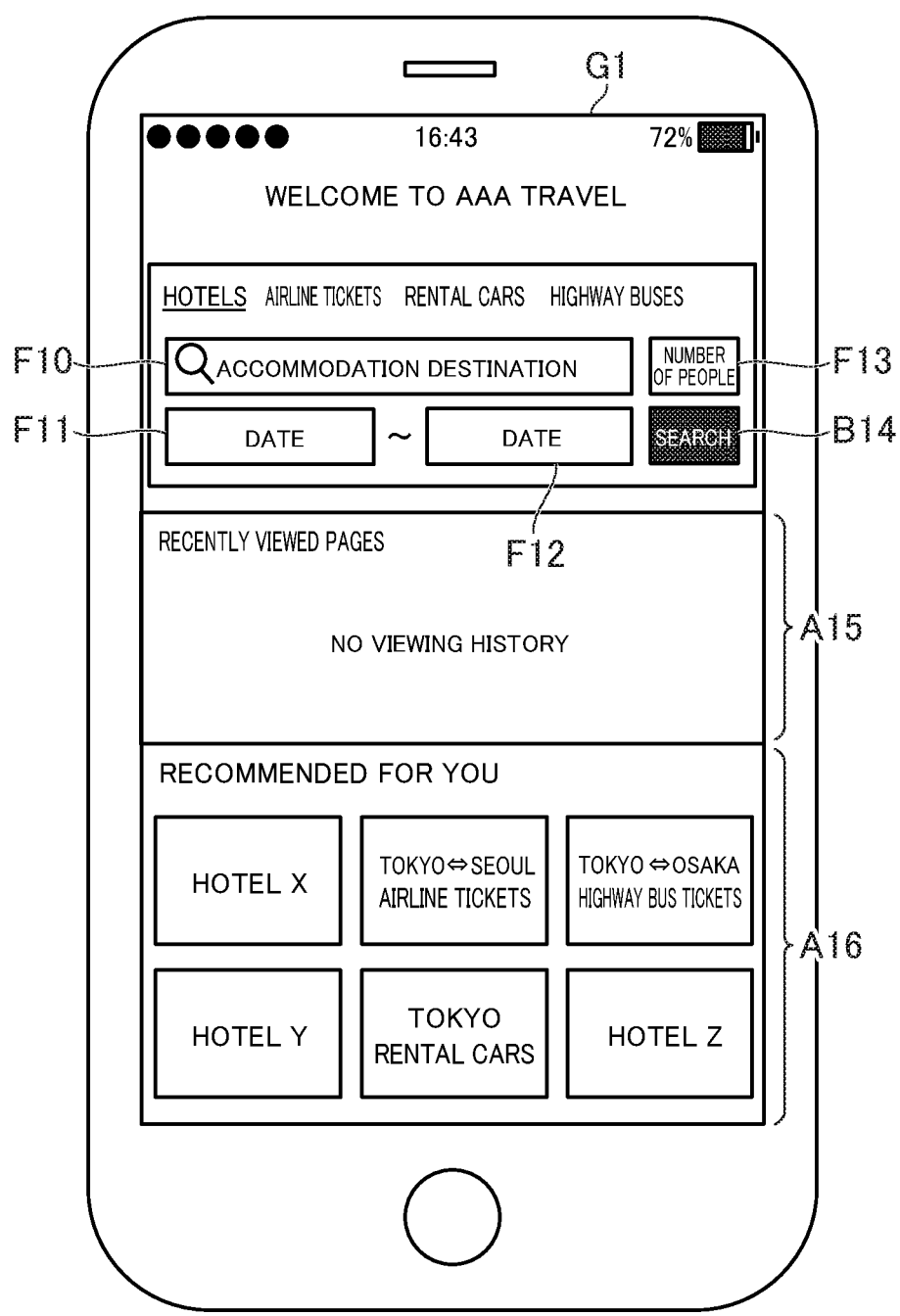
FIG. 2 is a diagram for illustrating an example of a top screen.

FIG. 2 is a diagram for illustrating an example of the top screen. As illustrated in FIG. 2, for example, input forms F10 to F13 for inputting search conditions and a button B14 for executing a search are displayed on a top screen G1. For example, the top screen G1 includes a display area A15 for displaying a hotel and the like recently viewed by the user, and a display area A16 for displaying a recommended hotel and the like.

As illustrated in FIG. 2, the top screen G1 enables the user to input various search conditions for a hotel reservation, an airline ticket reservation, a rental car reservation, and a bus reservation. The search conditions are a query to be used in the search, and any conditions may be input. The search conditions may be a keyword, a numerical value selected from among a plurality of predetermined numerical values (e.g., date, time, number of people, or budget), or attribute information on a category, for example.

For example, in the case of a hotel reservation, search conditions such as a place of stay, a date of use (date of stay), a number of users, and an accommodation rate are input. For example, in the case of an airline ticket reservation, search conditions such as a place of departure, an intended destination, a departure date, a departure time, an arrival date, an arrival time, an airline, and a fare are input. For example, in the case of a rental car reservation, search conditions such as a departure location, a return location, the date of use, a time of use, a vehicle type, and a rental cost are input. For example, in the case of a bus reservation, search conditions such as the place of departure, the intended destination, the departure date, the departure time, the arrival date, the arrival time, a bus company, and the fare are input.

In the first embodiment, in order to simplify the description, there is described processing to be performed when the user makes a hotel reservation. For example, the user inputs a keyword, for example, the place of stay, in the input form F10. The place of stay is not required to be input as a keyword, and may be selected from a list of regions prepared in advance. For example, a check-in date is input in the input form F11, and a check-out date is input in the input form F12. For example, the number of users is input in the input form F13. When the user inputs those search conditions and selects the button B14, a search is executed.

Figure 3:
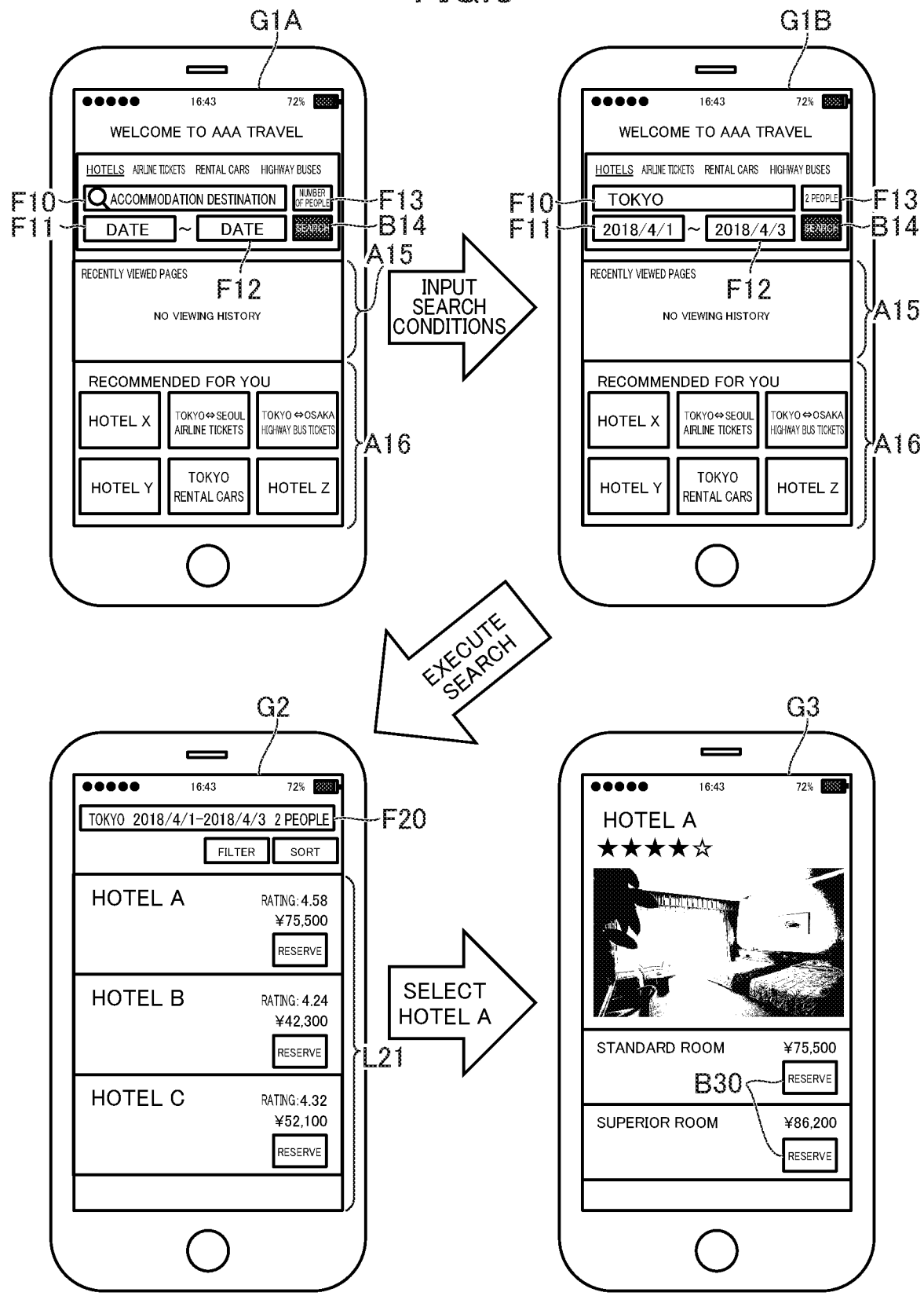
FIG. 3 is a diagram for illustrating how a search is executed.

FIG. 3 is a diagram for illustrating how a search is executed. As illustrated in top screens G1A and G1B of FIG. 3, for example, when the user inputs the search conditions in the input forms F10 to F13 and selects the button B14, a search is executed for hotels satisfying the search conditions. In the example of the top screen G1B of FIG. 3, a search is executed for, among the hotels in "Tokyo" input in the input form F10, hotels that have a room available for "two people" input in the input form F13 and on the date of use "Apr. 1, 2018" to "Apr. 3, 2018" input in the input forms F11 and F12.

As illustrated in FIG. 3, when a hotel search is executed, a search result screen G2 showing the search result is displayed on the display unit 15. For example, the search conditions used in the search are displayed in an input form F20 of the search result screen G2. When the user does not find a desired hotel, the user changes the search conditions from the input form F20 and executes the search again.

For example, the hotels retrieved in the search are displayed in a list L21 of the search result screen G2. In the list L21, the hotels retrieved in the search are displayed in a selectable manner. When it is not possible to display all of the hotels on the screen, the user may display the hotels that are not displayed by scrolling through the list L21 or performing a predetermined page turning operation. For example, a name, an image (not shown in FIG. 3), a user evaluation (rating), a price range, and other such information on the hotels retrieved in the search are displayed in the list L21.

As illustrated in FIG. 3, when the user selects a hotel displayed in the list L21, a hotel screen G3, which is a page showing the details of the hotel, is displayed on the display unit 15. In FIG. 3, there is illustrated a case in which the user selects "Hotel A" in the list L21, and the hotel screen G3 showing the page of "Hotel A" is displayed on the display unit 15. For example, the name, the evaluation, the image, a room name, and the rate of "Hotel A", and a button B30 for reserving the room, are displayed on the hotel screen G3.

For example, when the user selects the button B30, the screen transitions to a reservation screen of the room corresponding to the button B30. Then, after option information such as a meal or a beauty treatment has been selected and guest information has been input, the reservation is complete. The reservation may be performed with the values for the date of use and the number of users as input in the search conditions, or may be performed after changing the date of use and the number of users input in the search conditions.

Similarly, when the user selects "Hotel B" or "Hotel C" in the list L21 of FIG. 3, the hotel screen G3 showing the page of the selected "Hotel B" or "Hotel C" is displayed on the display unit 15. For example, the user repeats the search until he or she finds a desired hotel while moving back and forth between the search result screen G2 and the hotel screen G3 and changing the search conditions from the search result screen G2 to perform the search again.

In the first embodiment, the hotels displayed by the user on the hotel screen G3 are displayed as a viewing history (recently viewed pages) in the display area A15 of the top screen G1. For example, as illustrated in FIG. 3, when the user compares a plurality of hotels and then returns to the top screen G1, those hotels are displayed in the display area A15 as a viewing history.

Figure 4:
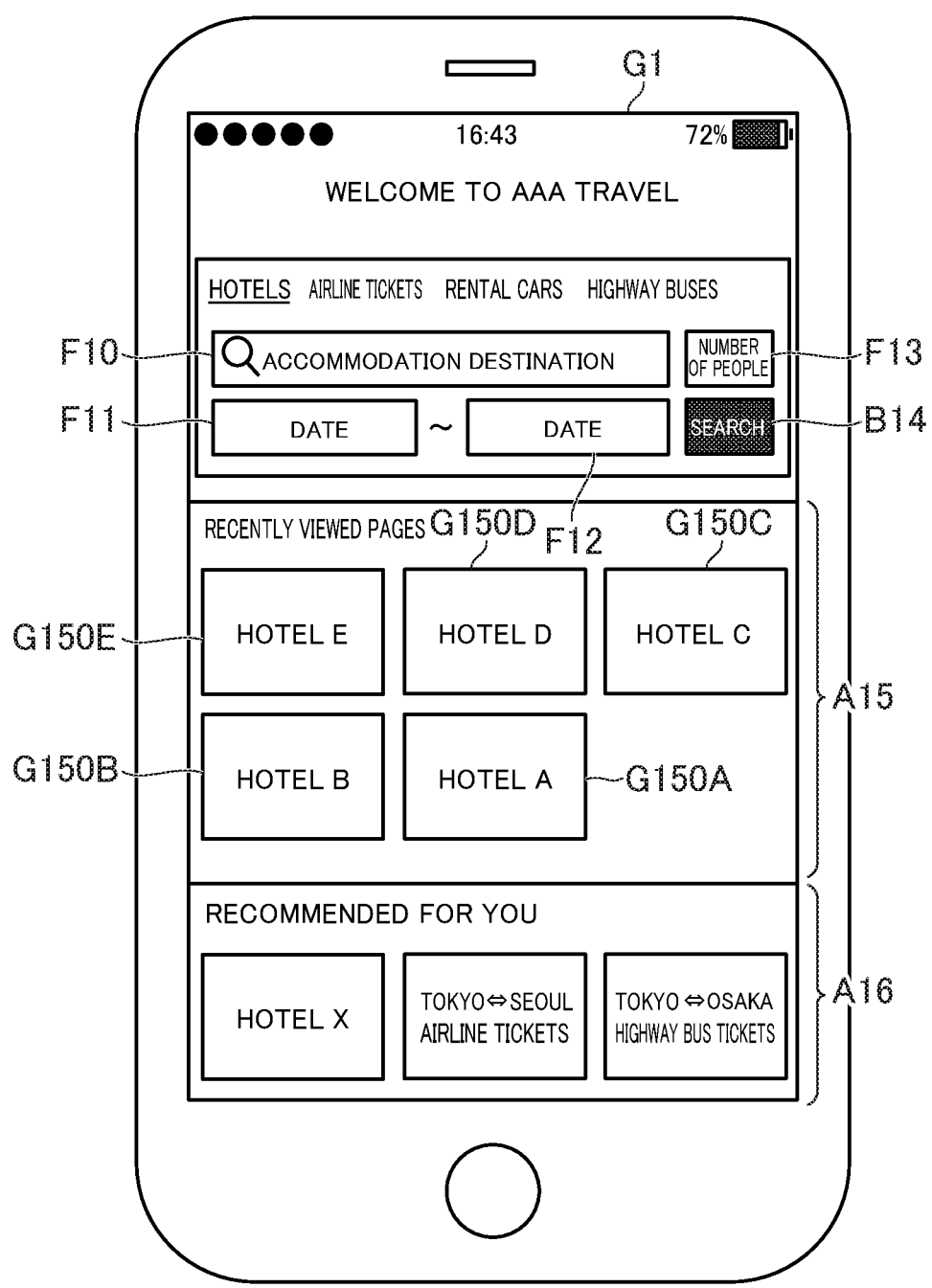
FIG. 4 is a diagram for illustrating how a viewing history is displayed on the top screen.

FIG. 4 is a diagram for illustrating how the viewing history is displayed on the top screen G1. In FIG. 4, there is illustrated an example in which the user viewed "Hotel A", "Hotel B", "Hotel C", "Hotel D", and "Hotel E" in the stated order. In the following description, the hotels viewed by the user are referred to as "viewed hotels".

As illustrated in FIG. 4, images G150A to G150E respectively representing those viewed hotels are displayed in the display area A15 in the viewed order. For example, in the display area A15, the most recently viewed hotel is displayed at the top left, and the other viewed hotels are arranged in chronological order to the right or in a downward direction therefrom. As a result, in the example of FIG. 4, the image G150E of "Hotel E" viewed most recently is arranged at the top left, and the images G150D to G150A of "Hotel D", "Hotel C", "Hotel B", and "Hotel A" are arranged in order. In the following description, the images G150A to G150E are simply referred to as "images G150" when it is not required to distinguish those images.

For example, the images G150 may include the hotel name, and may include a photograph of the outside or inside appearance of the viewed hotels. For example, information such as the location, the price range, and the user evaluation of the viewed hotels may be displayed on the images G150. When the user selects one of the images G150, the hotel screen G3 of the viewed hotel represented by the images G150 is displayed on the display unit 15. In this case, the hotel represented by the image G150 selected by the user is the most recently viewed hotel, and hence when the screen subsequently returns to the top screen G1, the arrangement of the images G150 is also updated. When the user selects the image G150E of "Hotel E" viewed most recently by the user, the viewed order of the respective hotels does not change, and hence the arrangement of the images G150 also does not change.

In the first embodiment, the search conditions used in the search for the hotels are associated with the viewed hotels. In the search example of FIG. 3, the search conditions (search conditions input on the top screen G1B) of "Tokyo" as the place of stay, "Apr. 1, 2018" to "Apr. 3, 2018" as the date of use, and "2 people" as the number of users are associated with each of "Hotel A", "Hotel B", "Hotel C", "Hotel D", and "Hotel E". The search conditions associated with the viewed hotels may also be displayed on the images G150. Specifically, the images G150 may be displayed in a manner that enables identification of the search conditions used in the search for the viewed hotels.

In the first embodiment, information on the availability situation based on the search conditions associated with the viewed hotels is displayed together with those hotels in the display area A15. In the example of FIG. 4, information on the presence or absence of a remaining room when the date of use is "Apr. 1, 2018" to "Apr. 3, 2018" and the number of users is "2 people" is displayed in the display area A15.

Figure 5:
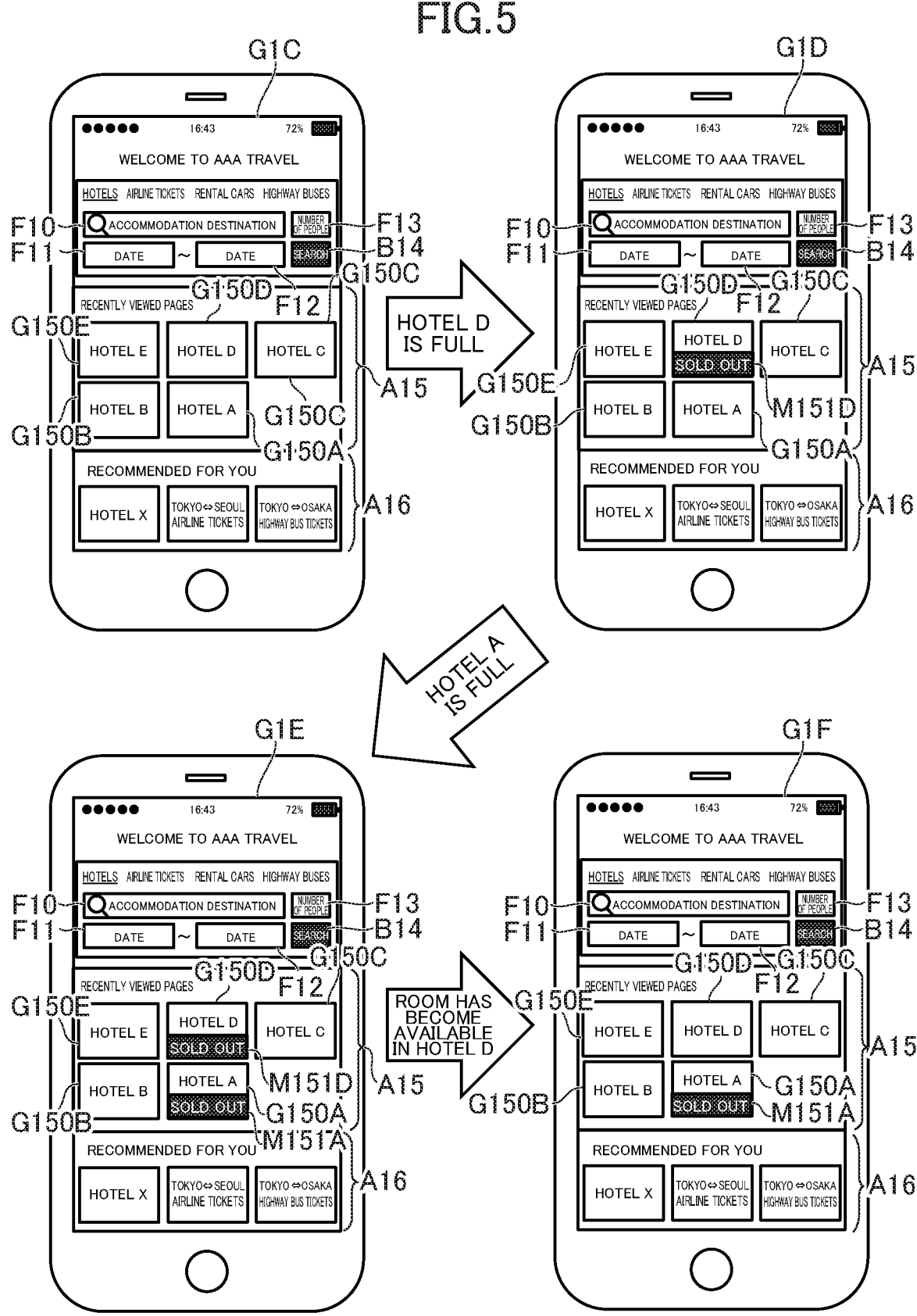
FIG. 5 is a diagram for illustrating how an availability situation is displayed in a display area.

FIG. 5 is a diagram for illustrating how the availability situation is displayed in the display area A15. As shown in the top screen G1C of FIG. 5, when any viewed hotels have an available room based on the search conditions at the time of the search, the image G150 of each hotel is displayed as it is in the display area A15. From this state, for example, when there are no longer remaining rooms for "Hotel D", as shown in the top screen G1D, a message M151D, for example, "SOLD OUT", is displayed on the image G150D of "Hotel D", to thereby notify the user that there are no available rooms based on the search conditions at the time of the search. In the message M151D, the search conditions at the time of the search may be displayed. For example, the date of use and the number of users input at the time of the search may also be displayed.

Subsequently, when there are no longer remaining rooms for "Hotel A" as well, as illustrated in the top screen G1E, a message M151A, for example, "SOLD OUT", is displayed on the image G150A of "Hotel A", to thereby notify the user that there are no available rooms based on the search conditions at the time of the search. Then, when a remaining room becomes available due to a cancellation for "Hotel D", as shown in the top screen G1F, the message M151D on the image G150D of "Hotel D" is removed and the original display is restored, to thereby notify the user that there is an available room for "Hotel D" based on the search conditions at the time of the search.

In the following description, when it is not required to distinguish between the messages M151A and B151D, the messages M151A and B151D are simply referred to as "message M151". Similarly, for "Hotel B", "Hotel C", and "Hotel E", the message M151 is displayed when there is no available room based on the search conditions at the time of the search, and when a room subsequently becomes available, the message M151 is removed. A determination of the stock of the viewed hotels may be executed only when the top screen G1 is displayed, or may be periodically executed while the top screen G1 is displayed and the display of the display area A15 may be periodically updated.

As described above, with the search system S of the first embodiment, through displaying of a list of the viewed hotels in the display area A15 of the top screen G1 and displaying the message M151 when there are no available rooms based on the search conditions at the time of the search, the user is prevented from selecting the images G150 despite the fact that there are no available rooms, which enhances the convenience of the user interface. The details of this technology are now described.

1-3. Functions to be Implemented in First Embodiment

Figure 6:
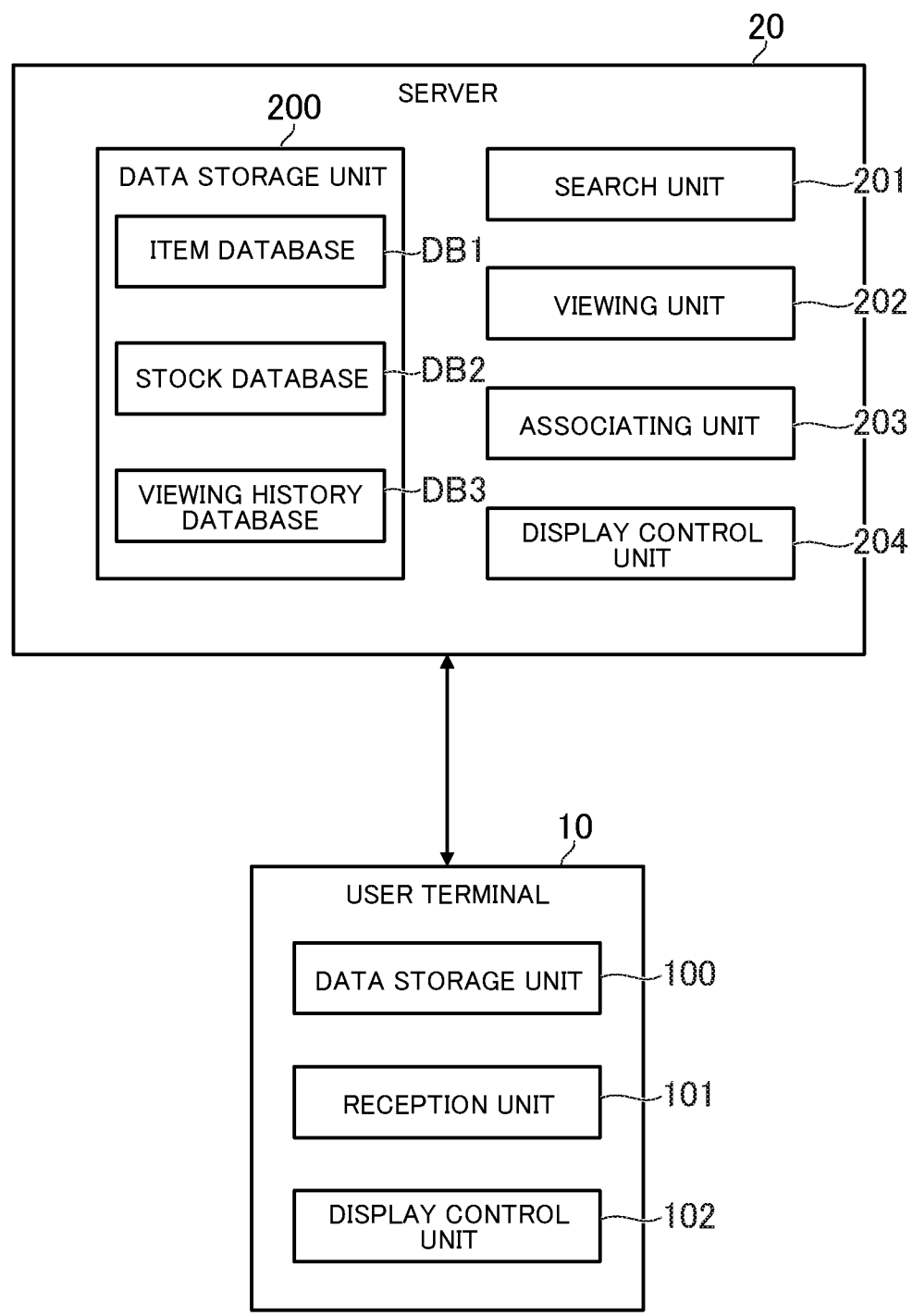
FIG. 6 is a function block diagram for illustrating an example of functions to be implemented by a search system according to a first embodiment of the present invention.

FIG. 6 is a function block diagram for illustrating an example of functions to be implemented by the search system S of the first embodiment. In the first embodiment, there is described a case in which the main functions relating to display control are implemented by the server 20, but as in the modification examples described later, the main functions may be implemented by the user terminal 10, or may be shared between the user terminal 10 and the server 20.

1-3-1. Functions to be Implemented by Server

As illustrated in FIG. 6, in the server 20, a data storage unit 200, a search unit 201, a viewing unit 202, an associating unit 203, and a display control unit 204 are implemented. The data storage unit 200, the search unit 201, the viewing unit 202, the associating unit 203, and the display control unit 204 are an example of storage means, search means, viewing means, associating means, and display control means, respectively.

[Data Storage Unit]

The data storage unit 200 is mainly implemented by the storage unit 22. The data storage unit 200 stores data required for searches and display control. As an example of the data stored in the data storage unit 200, there is described here an item database DB1, a stock database DB2, and a viewing history database DB3.

FIG. 7 is a table for showing a data storage example of the item database DB1. The item database DB1 is a database for storing various types of information on items for which there is stock information on each sub-item.

The items are information serving as a search target, and may be, for example, a service to be reserved by the user or a product to be purchased by the user. In other words, items may be referred to as "data items", or may be referred to as "individual records in the database to be searched". For this reason, items can also be referred to as "information on a service to be reserved by the user" or "information on a product to be purchased by the user".

For example, in the case of a hotel reservation, the items are hotels or rooms. In the case of an airline reservation, the items are airlines or seats. In the case of a rental car reservation, the items are vehicle to be rented. In the case of a bus reservation, the items are buses or seats. In the case of a train reservation, the items are trains or seats. In the case of a restaurant reservation, the items are restaurants, seats, or tables. In the case of an optional tour reservation, the items are optional tours.

The sub-items are information associated with the items, and may be, for example, the content (conditions) of the service to be reserved by the user or the content (conditions) of the product to be purchased by the user. Similarly to the items, the sub-items can also be referred to as "data items", but the sub-items are data items corresponding to a lower-level concept of the items. For example, a sub-item is an index for searching for an item, and is information to be compared with a search condition (search query). For example, the sub-items of each item may be the date of use relating to the item, and in this case, the search conditions may include a condition relating to the date of use. At least one sub-item is associated with each item.

For example, in the case of a hotel reservation, the sub-items are the hotel location, the date of use, or the number of users. In the case of an airline reservation, the sub-items are the place of departure, the intended destination, the departure date, the departure time, the arrival date, or the arrival time. In the case of a rental car reservation, the sub-items are a store location, the date of use, the time of use, a possible number of passengers, or a vehicle type. In the case of a bus reservation, the sub-items are the place of departure, the intended destination, the departure date, or the departure time. In the case of a train reservation, the sub-items are the place of departure, the intended destination, the departure date, the departure time, the arrival date, or the arrival time. In the case of a restaurant reservation, the sub-items are a restaurant location, the date of use, a meal genre, or a menu. In the case of an optional tour reservation, the sub-items are a location at which the tour is to be performed, the date of use, or tour content.

The stock information is information indicating a stock quantity of the sub-item. The stock quantity is the number of remaining items, and can also be referred to as "number of items that can be used" or "number of items that can be purchased". For example, the stock information is associated with the sub-items. For example, stock information exists for each sub-item. It is not required for stock information to be associated with all the sub-items, and it is sufficient if stock information is associated with at least one sub-item.

For example, in the case of a hotel reservation, the stock information indicates the number of remaining rooms in the hotel. In the case of an airline reservation, the stock information indicates the number of remaining seats in the aircraft. In the case of a rental car reservation, the stock information indicates the number of remaining vehicles. In the case of a bus reservation, the stock information indicates the number of remaining seats on the bus. In the case of a train reservation, the stock information indicates the number of remaining seats on the train. In the case of a restaurant reservation, the stock information indicates the number of remaining tables or seats in the restaurant. In the case of an optional tour reservation, the stock information indicates the number of remaining people for which a reservation can be performed.

In the first embodiment, in order to simplify the description, as an example, there is described a case in which a hotel corresponds to an item and a date of use corresponds to a sub-item. Therefore, in the first embodiment, the word "hotel" can be read as "item", and the words "date of use" can be read as "sub-item". As a result, the stock information indicates the number of remaining rooms for each date of use of each room.

As shown in FIG. 7, the item database DB1 stores data relating to the hotels. For example, a hotel ID for uniquely identifying each hotel, hotel information, and room information are stored.

The hotel information is basic information on the hotel. For example, a name, address, contact information, building image, facilities within the hotel, amenities, and a price range of the hotel are stored. The room information is basic information on each room in the hotel. For example, a room ID for uniquely identifying the room, the room name, the number of people who can use the room, a room type, a layout, a size, presence or absence of a bath and bathroom, and introductory description about the room are stored.

The hotel information and the room information may be used as an index at the time of the search. For example, when the location of the place of stay is input as a query, the address of the hotel information is used as an index. For example, when the number of users is input as a query, the number of people who can use the room of the room information is used an index.

In the first embodiment, there is described an example of a hotel search, and hence, in FIG. 7, only data relating to hotels is shown in the item database DB1. However, data relating to airline tickets, car rentals, or buses may be stored in the item database DB1. In this case, the type of each piece of data may be identified by using an ID for identifying the type of each data (provider of each service), such as a hotel, an airline ticket, a car rental, or a bus.

FIG. 8 is a table for showing a data storage example of the stock database DB2. As shown in FIG. 8, the stock database DB2 is a database for storing stock information on each date of use. For example, the hotel ID, the room ID, the date of use, and the stock information are stored in the stock database DB2. For example, there are a plurality of types of rooms in a hotel and a plurality of rooms of the same type, and hence the stock database DB2 stores the date of use and the stock information as a pair for each type of hotel room. The date of use of the stock database DB2 is used as an index at the time of the search. For example, the stock information from the check-in date until the day before the check-out date input in the search conditions may be referred to.

FIG. 9 is a table for showing a data storage example of the viewing history database DB3. As shown in FIG. 9, the viewing history database DB3 is a database for storing the viewing history of the user. For example, in the viewing history database DB3, a user ID for uniquely identifying the user, the viewed order, the hotel ID of the viewed hotels, the search conditions used in the search, and a viewing time are stored. The viewing history database DB3 is updated by the associating unit 203, which is described later.

Data to be stored in the data storage unit 200 is not limited to the above-mentioned example. For example, the data storage unit 200 may store image data for displaying the screens illustrated in FIG. 2 to FIG. 5. For example, the data storage unit 200 may also store a database for storing basic information on each user. For example, the residence of the user may be stored in the database and used as the place of departure for an airline ticket reservation or the like.

[Search Unit]

The search unit 201 is mainly implemented by the control unit 21. The search unit 201 executes a hotel search based on the search conditions input by the user. Various known processing may be applied to the search itself. For example, when a keyword search is to be executed, a perfect match or a partial match may be used, or a fuzzy search may be used. For example, when a numerical search is to be executed, numerical values matching a numerical range specified by the search conditions are searched.

The hotel search is an example of an item search in the present invention. The item search may be any processing for searching for an item, and is processing in which search conditions are used as a query to search for an item having an index that matches the query. In other words, the item search is processing of searching the item database DB1 for the record of the item that matches the search conditions.

The search unit 201 receives the search conditions from the user terminal 10, and executes a hotel search based on the received search conditions. In the first embodiment, the search unit 201 receives, from the user terminal 10, the search conditions input in the input forms F10 to F13 of the top screen G1, and executes a hotel search based on the received search conditions. In this example, the place of stay, the date of use, and the number of users are input in the input forms F10 to F13, and hence the search unit 201 uses the input place of stay, date of use, and number of users as a query. The hotel search is executed through use of the hotel information and the room information stored in the item database DB1 and the date of use stored in the stock database DB2 as an index.

For example, the search unit 201 searches for records in which the place of stay input in the input form F10 matches the address stored in the hotel information, and identifies hotels matching the place of stay. Then, the search unit 201 narrows the search to, from among the identified hotels, hotel rooms in which the number of people input in the input form F13 matches the number of people who can use the room stored in the room information. The search unit 201 then refers to the stock database DB2 and narrows the search to, from among the narrowed-down hotel rooms, rooms that are available for the date of use input in the input forms F11 and F12. The search unit 201 then acquires, as a search result, the hotels having a room finally obtained by narrowing the search. The hotels included in the search result can each be said to be a hotel matching the search conditions.

[Viewing Unit]

The viewing unit 202 is mainly implemented by the control unit 21. The viewing unit 202 views a hotel selected by the user from among the search results obtained by the search unit 201. The search result is a processing result obtained by the search unit 201, and may include, for example, information such as the hotel ID, hotel information, room information, and stock information on the hotels retrieved in the search. In the first embodiment, the search result is displayed in the list L21 included in the search result screen G2.

The term "viewing" refers to display of information on the hotel on the display unit 15. For example, the information on the hotel is at least one of hotel information, room information, and stock information. The viewing unit 202 views the hotel by displaying the hotel screen G3 on the display unit 15. In other words, the term "viewing" refers to the transmission of information on the hotel from the server 20 to the user terminal 10. The viewing unit 202 views the hotel by transmitting the display data on the hotel screen G3 to the user terminal 10. The display data may be data for displaying a screen, and is, for example, HTML data, image data, or text data.

In the first embodiment, the viewing unit 202 is implemented by the server 20. Therefore, the viewing unit 202 receives from the user terminal 10 the hotel ID of the hotel selected by the user from the list L21, and views the hotel indicated by the received hotel ID. For example, the viewing unit 202 generates the display data on the hotel screen G3 based on the hotel information and the room information on a record in which the received hotel ID is stored from among the records of the item database DB1, and transmits the generated display data to the user terminal 10. As a result, the user can view the details of the hotel. For example, the viewing unit 202 may also view the stock information by transmitting to the user terminal 10 the stock information on a record in which the received hotel ID is stored from among the records of the stock database DB2.

For example, when a viewed hotel displayed by the display control unit 204 is selected by the user, the viewing unit 202 may view the viewed hotel based on the search conditions associated with the viewed hotel. More specifically, when a viewed hotel displayed in the display area A15 is selected, the viewing unit 202 may generate the display data on the hotel screen G3 based on the search conditions at the time of the search for the viewed hotel, and transmit the generated display data to the user terminal. The viewing unit 202 refers to a record in which the hotel ID of the viewed hotel selected by the user is stored from among the records of the viewing history database DB3, and acquires the search conditions. Then, the viewing unit 202 refers to a record in which the hotel ID is stored from among the records of each of the item database DB1 and the stock database DB2, searches for rooms satisfying the search conditions, and views the viewed hotel.

[Associating Unit]

The associating unit 203 is mainly implemented by the control unit 21. The associating unit 203 records in the data storage unit 200 the viewed hotels and the search conditions used in the search in association with each other.

The viewed hotels are the hotels that has already been viewed by the user based on control by the viewing unit 202. In other words, the viewed hotels are the hotels for which the hotel screen G3 has been displayed on the display unit 15 by the viewing unit 202, and for which the display data on the hotel screen G3 is transmitted to the user terminal 10.

The search conditions used in the search are the search conditions input at the time of the search of the viewed hotels. In other words, the search conditions used in the search are the search conditions that were used as a query at the time of searching for the viewed hotels. After the search is executed by the search unit 201, the search conditions are held in the data storage unit 200, and are stored in the viewing history database DB3 when a hotel is viewed. The term "associate" as used herein means the linking of pieces of information to each other, which enables a plurality of information to be mutually searchable on a database.

The viewed hotels and the search conditions may be associated with each other in any database included in the data storage unit 200, but in the first embodiment, the viewed hotels and the search conditions are associated with each other in the viewing history database DB3. For example, the associating unit 203 stores the hotel IDs of the viewed hotels and the search conditions used in the search in the same record of the viewing history database DB3.

For example, when a hotel is viewed by the user by using the viewing unit 202, the associating unit 203 stores the viewed hotel and the search conditions in the viewing history database in association with each other. In other words, each time a hotel is viewed by the user by using the viewing unit 202, the associating unit 203 stores the viewed hotel and the search conditions in the viewing history database in association with each other.

The search conditions may be stored as it is, or only the search conditions influencing the stock information may be stored. For example, the place of stay input as a search condition does not influence the stock information, and hence it is not always required that the place of stay input as the search condition be stored in the viewing history database DB3, and only the date of use and the number of users may be stored in the viewing history database DB3.

In the case where the viewed hotels are viewed again, when the search conditions have changed, the associating unit 203 stores the new search conditions and the viewed hotels in the viewing history database DB3 in association with each other. In this case, the record in which the old search conditions are stored may be left as it is or discarded. For example, the search conditions of the record in which the old search conditions are stored may be updated to new search conditions. In this case, the viewing date and time of the viewing history database DB3 may be updated to the latest viewing date and time.

[Display Control Unit]

The display control unit 204 is mainly implemented by the control unit 21. The display control unit 204 controls the display of the viewed hotels based on the stock information on the date of use satisfying the search conditions associated with the viewed hotels.

When the search conditions are satisfied, this means that the search conditions and the index match. In other words, satisfying the search conditions corresponds to being retrieved in the search. In the first embodiment, the date of use is equivalent to a sub-item, and the stock information is associated with the date of use. Therefore, when the date of use included in the search conditions matches the date of use stored in the stock database DB2, this is equivalent to satisfaction of the search conditions associated with the viewed hotels.

The number of viewed hotels to be subjected to the display control may be only one viewed hotel, or may be a plurality of viewed hotels. When a plurality of viewed hotels are to be subjected to the display control, all of the viewed hotels stored in the viewing history database DB3 may be subjected to the display control, or a part of the viewed hotels may be subjected to the display control. When a part of the viewed hotels is to be subjected to the display control, a predetermined number of the most recently viewed hotels may be subjected to the display control, or randomly selected viewed hotels may be subjected to the display control. The predetermined number may be within a range (e.g., from about 2 to about 10) that fits on the display area A15, or may be more.

For example, when the display control unit 204 receives from the user terminal 10 a display request for the viewing history, the display control unit 204 refers to a record in which the user ID of the user who transmitted the display request is stored from among the records of the viewing history database DB3. The display request may be any request having a predetermined format for displaying the viewing history, and, in the first embodiment, is a request for displaying the top screen G1. The user ID may be stored in advance in a data storage unit 100 of the user terminal 10.

The display control unit 204 refers to a predetermined number of the most recent records from among the above-mentioned referenced records. For example, as shown in FIG. 9, when data is stored in the viewing history database DB3 in order of the most recent viewing time, the display control unit 204 refers to a predetermined number of the records in that order. Then, the display control unit 204 acquires, based on the stock database DB2, the stock information on the date of use indicated by the search conditions stored in each of the referenced records, and controls the display of the viewed hotels based on the acquired stock information.

For example, the display control unit 204 may determine the presence or absence of stock based on stock information on the date of use satisfying the search conditions associated with the viewed hotels, and perform display control based on the determination result. For example, the display control unit 204 determines that there is stock when a value indicated by the stock information is equal to or larger than a threshold value, and determines that there is no stock when the value is smaller than the threshold value. In the first embodiment, the threshold value is 1, but the threshold value may be set to a numerical value of 2 or larger (e.g., numerical value of from 2 to 5), and when there is only a small amount of stock remaining, it may be regarded that there is no stock.

The processing of determining the presence or absence of stock may be performed such that processing of determining whether or not the date of use has passed is not particularly included, or performed such that processing of determining whether or not the date of use has passed is included. When the date of use of the viewed hotels has passed, it is not required to determine the presence or absence of stock for the date of use, and hence the display control unit 204 is not required to determine the presence or absence of stock for viewed hotels for which the date of use has passed. The processing of determining the presence or absence of stock may include processing of determining whether or not the date of use of the viewed hotels has passed.

For example, the display control unit 204 may display, in association with the viewed hotels, information indicating the presence or absence of stock for the date of use satisfying the search conditions associated with the viewed hotels.

The information indicating the presence or absence of stock is information enabling identification of the presence or absence of stock, and may be, for example, information indicating that there is stock, or information indicating that there is no stock. In the first embodiment, there is described a case in which the message M151 corresponds to the information indicating the presence or absence of stock, but other information may be displayed. For example, an icon indicating the presence or absence of stock may be displayed.

The expression "displaying in association with" means, for example, displaying information indicating the presence or absence of stock on or near a viewed hotel, displaying information indicating the presence or absence of stock by connecting such information to a viewed hotel by a line or the like, or displaying information indicating the presence or absence of stock within a viewed hotel.

In the first embodiment, there is described a case in which displaying the message M151 on the images G150 of the viewed hotels corresponds to "displaying in association with". Therefore, for example, when there is no stock for the date of use satisfying the search conditions associated with a viewed hotel, the display control unit 204 displays a message M151 indicating that effect on the image G150 of the viewed hotel. The image data on the message M151 may be stored in the data storage unit 200 in advance.

The display control unit 204 may also display, when there is no stock for date of use satisfying the search conditions associated with a viewed hotel, a message, an icon, or the like indicating that there is stock on the image G150 of the viewed hotel. In this case, the display control unit 204 may display a message, an icon, or the like indicating the current stock quantity.

The display control to be executed by the display control unit 204 is not limited to the display of information indicating the presence or absence of stock. For example, the display control unit 204 may change the display mode of the images G150 representing the viewed hotels based on the presence or absence of stock. The display mode is, for example, a size, a color, a brightness, a transparency level, a shape, a pattern, or the like of the image.

The display control unit 204 may display the images G150 in a first display mode (e.g., normal color that has not been processed) when there is stock, and display the images G150 in a second display mode (e.g., grayed out) when there is no stock. For example, the display control unit 204 may also display the stock quantity indicated by the stock information as it is without determining the presence or absence of stock.

1-3-2. Functions to be Implemented by User Terminal

As illustrated in FIG. 6, in the user terminal 10, the data storage unit 100, a reception unit 101, and a display control unit 102 are implemented. The data storage unit 100, the reception unit 101, and the display control unit 102 are an example of storage means, reception means, and display control means, respectively.

[Data Storage Unit]

The data storage unit 100 is mainly implemented by the storage unit 12. The data storage unit 100 stores data received from the server 20. For example, the data storage unit 100 may store the display data on each of the top screen G1, the search result screen G2, and the hotel screen G3. The data storage unit 100 may also store, for example, a user ID and the hotel IDs of the hotels included in the list L21.

[Reception Unit]

The reception unit 101 is mainly implemented by the control unit 11. The reception unit 101 receives user operations based on a detection signal obtained by an operation unit 14. When the reception unit 101 receives a user operation, the user terminal 10 transmits information indicating the content of the operation to the server 20. For example, when the reception unit 101 receives an operation, the user terminal 10 transmits, to the server 20, information for identifying which operation has been performed.

[Display Control Unit]

The display control unit 102 is mainly implemented by the control unit 11. The display control unit 102 displays various screens based on the display data received from the server 20. For example, the display control unit 102 displays the top screen G1, the search result screen G2, and the hotel screen G3. For example, when each of those screens is to be displayed by using a web browser, the display data may be HTML data, and when each of those screens is to be displayed by using a program of the user terminal 10 (e.g., travel reservation application), the display data may be image or text information to be embedded in a frame.

1-4. Processing to be Executed in First Embodiment

Figure 10:
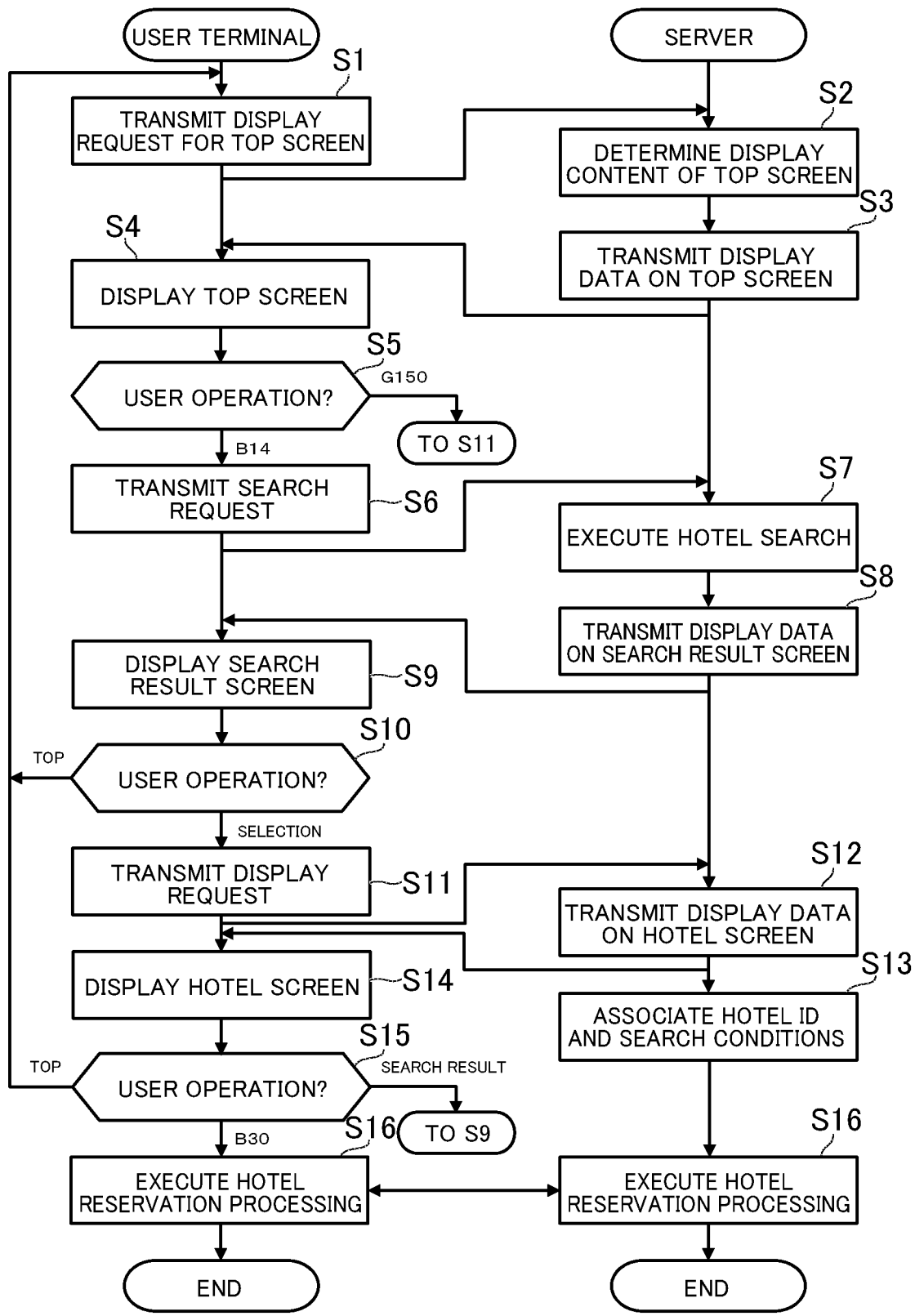
FIG. 10 is a flowchart for illustrating an example of processing to be executed by the search system.

FIG. 10 is a flowchart for illustrating an example of processing to be executed by the search system S. The processing illustrated in FIG. 10 is executed by the control units 11 and 21 operating in accordance with programs stored in the storage units 12 and 22, respectively. The processing described below is an example of the processing to be executed by the function blocks illustrated in FIG. 6.

As illustrated in FIG. 10, first, in the user terminal 10, when a predetermined operation is performed from the operation unit 14, the control unit 11 transmits to the server 20 a request for displaying the top screen G1 (Step S1). For example, the predetermined operation may be an operation of selecting a URL of the top screen G1, or may be an operation of activating the travel reservation application. The display request for the top screen G1 is performed when data having a predetermined format is transmitted. The display request includes information (e.g., URL or screen ID) for identifying the top screen G1. When some kind of data is transmitted from the user terminal 10 to the server 20, the user ID stored in the storage unit 12 is also transmitted.

In the server 20, when the display request is received, the control unit 21 determines the display content of the top screen G1 based on the viewing history database DB3 (Step S2).

Figure 11:
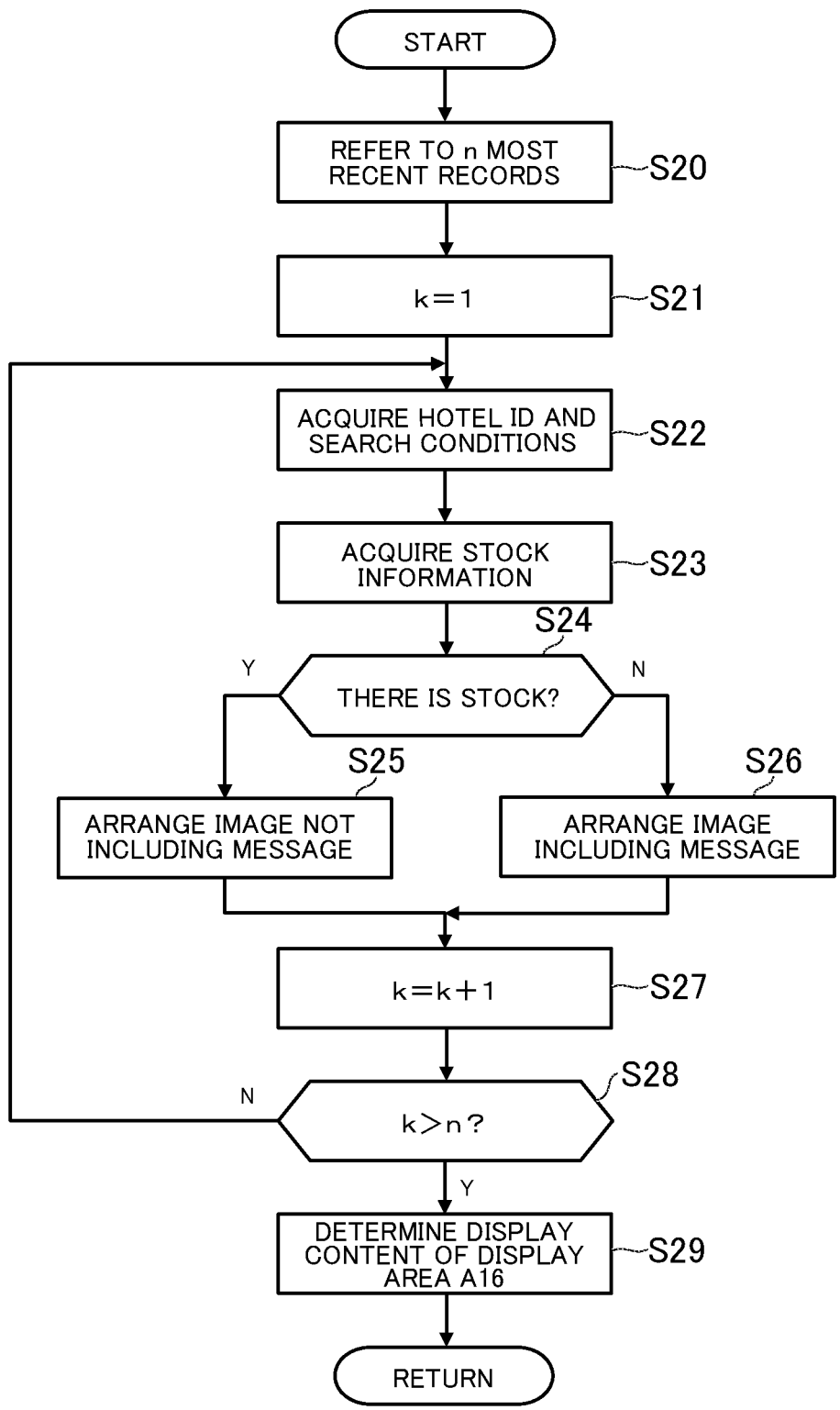
FIG. 11 is a flowchart for illustrating details of processing of Step S2.

FIG. 11 is a flowchart for illustrating details of the processing of Step S2. As illustrated in FIG. 11, the control unit 21 identifies the records in which the user ID received together with the display request is stored from among the records of the viewing history database DB3, and refers to n (n is a natural number) most recent records (Step S20). In Step S20, the control unit 11 may refer to n records in order of the most recent viewing time, or may refer to n records in order of the most recent record number.

The control unit 21 substitutes 1 into a counter variable k (Step S21). The control unit 21 then acquires the hotel IDs and the search conditions stored in the k-th record from among the records acquired in Step S20 (Step S22).

The control unit 21 acquires, based on the item database DB1 and the stock database DB2, the stock information on the date of use satisfying the search conditions acquired in Step S22 (Step S23). In Step S23, the control unit 21 refers to the records in which the hotel IDs acquired in Step S22 are stored from among the records of the item database DB1, and identifies the room IDs of the rooms satisfying the number of users included in the search conditions. Then, the control unit 21 refers to the records in which the hotel IDs and the room IDs are stored from among the records of the stock database DB2, and acquires the stock information on the date of use indicated by the search conditions.

The control unit 21 determines the presence or absence of stock based on the stock information acquired in Step S23 (Step S24). In Step S24, the control unit 21 determines whether the numerical value indicated by the stock information is equal to or larger than 1.

When it is determined that there is stock (Step S24: Y), the control unit 21 arranges in the display area A15 an image G150 that does not include the message M151 of "SOLD OUT" (Step S25). The image G150 of each hotel may be stored in advance in the item database DB1 or the like. Meanwhile, when it is determined that there is no stock (Step S24: N), the control unit 21 arranges in the display area A15 an image G150 that includes the message M151 of "SOLD OUT" (Step S26).

The control unit 21 increments the counter variable k (Step S27), and then determines whether the counter variable k has become larger than n (Step S28). This means that, in Step S28, the control unit 21 determines whether or not the processing from Step S22 to Step S27 has been executed for all of the n records acquired in Step S20.

When it is determined that the counter variable k is equal to or smaller than n (Step S28: N), the processing returns to Step S22, and the processing of Step S22 to Step S27 is executed for the next record. Meanwhile, when it is determined that the counter variable k is larger than n (Step S28: Y), the control unit 11 determines the display content of the display area A16 (Step S29) and ends the processing of Step S2, and the processing advances to Step S3 of FIG. 10. In Step S29, the control unit 11 may analyze a preference of the user based on the viewing history database DB3 to determine a hotel or the like to be recommended. For example, when the user makes a reservation for a hotel, a recommendation corresponding to the type of a reserved item, for example, recommending content (airline ticket, car rental, or bus) other than the hotel, may be made.

Returning to FIG. 10, the control unit 21 generates the display data on the top screen G1 based on the processing result of Step S2, and transmits the display data to the user terminal 10 (Step S3). The display data on the top screen G1 includes identification information (e.g., hotel ID) of the hotels or the like displayed in the display areas A15 and A16. As a result, for example, when the user selects an image G150, it becomes possible to identify which viewed hotel has been selected.

In the user terminal 10, when display data is received, the control unit 11 displays the top screen G1 on the display unit 15 based on the display data (Step S4). The control unit 11 then identifies a user operation based on the detection signal of the operation unit 14 (Step S5). In this example, there is described a case in which any one of an operation of selecting the button B14 or an operation of selecting an image in the display area A15 is performed. When the operation of inputting the search conditions in the input forms F10 to F12 is performed, the input content is displayed in the input forms F10 to F12 and recorded in the storage unit 12.

When the button B14 is selected (Step S5: B14), the control unit 11 transmits a search request for requesting execution of a search (Step S6). The search request may be performed by transmitting data having a predetermined format, and includes the search conditions input in the input forms F10 to F13.

In the server 20, when the search request is received, the control unit 21 executes a hotel search based on the search conditions included in the search request and based on the item database DB1 and the stock database DB2 (Step S7). In Step S7, the control unit 21 executes the search through use of the search conditions as a query and the hotel information and the room information stored in the item database DB1 and the date of use stored in the stock database DB2 as an index. The control unit 21 searches for hotels having a room matching the search conditions and for which there is stock of the room, and acquires a search result.

The control unit 21 generates the display data on the search result screen G2 based on the execution result of Step S7 and transmits the display data to the user terminal 10 (Step S8). In this example, the display data on the search result screen G2 includes the hotel IDs of the hotels included in the list L21. As a result, for example, when the user selects a hotel in the list L21, it is possible to identify which hotel is selected.

In the user terminal 10, when the display data is received, the control unit 11 displays the search result screen G2 on the display unit 15 (Step S9). The control unit 11 then identifies a user operation based on the detection signal obtained by the operation unit 14 (Step S10). In this example, there is described a case in which an operation for returning to the top screen G1 or an operation of selecting a hotel in the list L21 is performed.

When an operation for returning to the top screen G1 is performed (Step S10: top), the processing returns to Step S1, and a display request for the top screen G1 is transmitted. When an operation of selecting a hotel in the list L21 is performed (Step S10; selection), the control unit 11 transmits a display request for the hotel screen G3 (Step S11). The display request for the hotel screen G3 includes the hotel ID of the hotel selected from the list L21.

In the server 20, when the display request is received, the control unit 21 generates the display data on the hotel screen G3 based on the item database DB1, and transmits the display data to the user terminal 10 (Step S12). In Step S12, the control unit 21 refers to the record in which the hotel ID included in the display request is stored from among the records of the item database DB1, and generates the display data on the hotel screen G3 based on the hotel information and the room information. In Step S12, the control unit 21 may display only rooms that were retrieved in the search of Step S7, or may display other rooms in the same hotel.

The control unit 21 stores the hotel ID included in the display request and the search conditions received in Step S7 in the viewing history database DB3 in association with each other (Step S13). In Step S12, the control unit 21 creates a new record in the viewing history database DB3 and stores the user ID, the hotel ID, the search conditions, and the viewing time received together with the display request. The viewing time may be stored as the current time acquired by a real-time clock or the like.

In the user terminal 10, when the display data is received, the control unit 11 displays the hotel screen G3 on the display unit 15 (Step S14). The control unit 11 then identifies a user operation based on the detection signal obtained by the operation unit 14 (Step S15). In this example, there is described an operation for returning to the top screen G1, an operation for returning to the search result screen G2, or an operation of selecting the button B30.

When an operation for returning to the top screen G1 is performed (Step S15: top), the processing returns to Step S1, and a display request for the top screen G1 is transmitted. Meanwhile, when an operation for returning to the search result screen G2 is performed (Step S15: search result), the processing returns to Step S9, and the displayed screen returns to the search result screen G2.

Meanwhile, when an operation of selecting the button B30 is performed (Step S15: B30), hotel reservation processing is executed between the user terminal 10 and the server 20 (Step S16), and the processing ends. In Step S16, guest information and the like input in the user terminal 10 are transmitted to the server 20, and the server 20 records the guest information and the like in the storage unit 22, and updates the stock database DB2 such that the stock of the hotel room reserved by the user decreases.

When an operation of selecting an image G150 in the display area A15 is performed in Step S5 (Step S5: G150), the processing advances to Step S11, and a display request for the hotel screen G3 of the viewed hotel indicated by the image G150 selected by the user is transmitted. In this case, in the subsequent Step S12, the control unit 11 refers to the record in which the hotel ID included in the display request is stored from among the records of the viewing history database DB3, and the display data on the hotel screen G3 is generated based on the search conditions stored in the record. In this case, the hotel is not selected from the search results, and therefore the processing of Step S13 is not executed.

In the search system. S of the first embodiment, the display of the viewed hotels is controlled based on the stock information on the date of use satisfying the search conditions associated with the viewed hotels, and the content of the stock can be grasped from the display of the viewed hotels. As a result, the convenience of the user interface can be enhanced. For example, when the viewed hotels are displayed without any association with stock information, a viewed hotel for which there are no remaining rooms may be selected. In such a case, even when the hotel screen G3 is displayed, it is not possible to make a reservation, and the user is forced to waste time and effort to return to the original page or move to another page. However, with the search system S, the stock-related content can be grasped from the display of the viewed hotels. As a result, such a waste of time and effort can be prevented from occurring, and a user interface that is convenient for the user can be provided. With the search system S, the user is not forced to waste time and effort to return to the original page or move to another page, and hence the number of processes required by the server 20 to generate and transmit the display data on the hotel screen G3 can be reduced, thereby enabling the processing load on the server 20 to be reduced. Further, the display data being transmitted over the network is reduced, and hence the communication load can also be reduced.

The presence or absence of stock is determined based on the stock information on the date of use satisfying the search conditions associated with the viewed hotels, and the display control of the viewed hotels is performed based on the determination result. As a result, the presence or absence of stock can be grasped from the display of the viewed hotels, which enables the convenience of the user interface to be effectively enhanced.

The message M151 indicating the presence or absence of stock for the date of use satisfying the search conditions associated with the viewed hotels is displayed in association with the images G150 representing the viewed hotels, and it thus becomes easier to grasp the presence or absence of stock. As a result, the convenience of the user interface can be effectively enhanced.

In addition, when a viewed hotel displayed in the display area A15 is selected by the user, the hotel screen G3 of the viewed hotel is displayed based on the search conditions associated with the viewed hotel, and the time and effort to input the search conditions again is thus eliminated. As a result, the operation load on the user can be reduced.

2. Second Embodiment

Next, the search system S according to another embodiment of the present invention is described. As described in the first embodiment, the viewed hotels are displayed in the display area A15 of the top screen G1. When the user reserves a hotel, the other hotels retrieved based on the same search conditions as those of the reserved hotel have a low probability of being reserved by the user. Therefore, continuing to display those hotels in the display area A15 means that unrequired information is displayed. As a result, in a second embodiment of the present invention, among the hotels viewed by the user, the hotels retrieved based on the same search conditions as those of the reserved hotel are not displayed in the display area A15.

In the second embodiment, there is described a case in which, like in the first embodiment, a hotel corresponds to an item and the date of use corresponds to a sub-item. In the second embodiment, description of parts that are the same as in the first embodiment is omitted, and parts that are different from the first embodiment are described. The processing of displaying the message M151 described in the first embodiment may be executed in the second embodiment, or may be omitted so that the processing is not executed in particular in the second embodiment. Specifically, in the second embodiment, even when there is no stock of a viewed hotel, it is not always required for the message M151 to be displayed.

2-1. Outline of Second Embodiment

Figure 12:
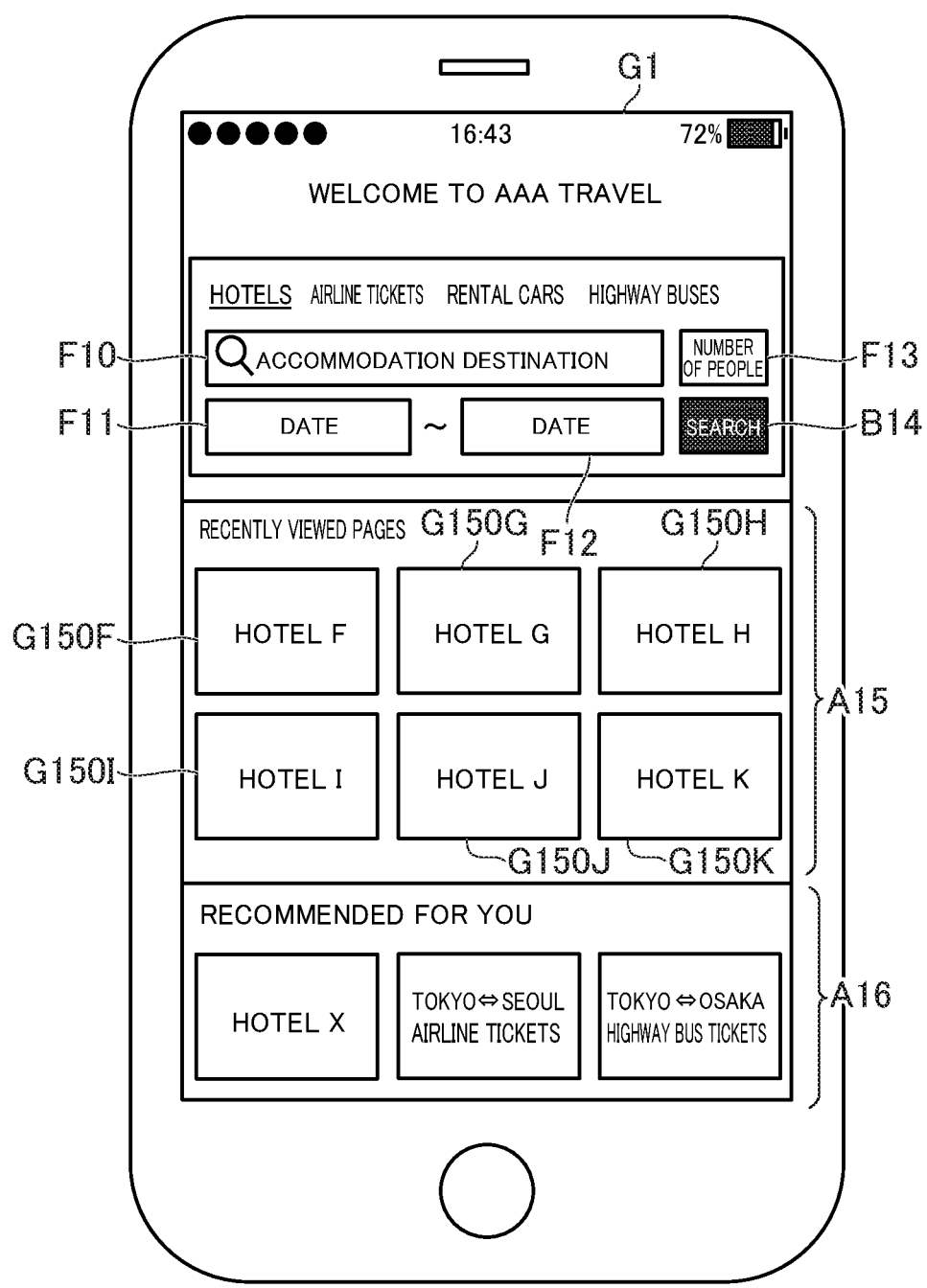
FIG. 12 is a diagram for illustrating an example of a top screen in a second embodiment of the present invention.

FIG. 12 is a diagram for illustrating an example of the top screen G1 in the second embodiment. As illustrated in FIG. 12, the layout of the top screen G1 is the same as that of the top screen G1 in the first embodiment. For example, in the display area A15, the images G150 representing the viewed hotels are displayed in the viewed order.

For example, "Hotel F", "Hotel G", and "Hotel H" represented by the images G150F to G150H, respectively, are hotels retrieved and viewed based on the same search conditions. In this case, the search conditions for those three hotels are "Tokyo" as the place of stay, "Apr. 1, 2018" to "Apr. 3, 2018" as the date of use, and "two" as the number of users.

"Hotel I", "Hotel J", and "Hotel K" represented by images G150I to G150K, respectively, are also hotels retrieved and viewed based on the same search conditions. However, the search conditions are, unlike the search conditions for "Hotel F", "Hotel G", and "Hotel H", "New York" as the place of stay, "May 15, 2018" to "May 18, 2018" as the date of use, and "4" as the number of users.

For example, when the user has not yet reserved a hotel, as illustrated in FIG. 12, the images G150F to G150K are displayed in the display area A15. When the user subsequently reserves "Hotel F", "Hotel F", "Hotel G", and "Hotel H" are removed from the display area A15, and the viewed hotels displayed in the display area A15 change.

Figure 13:
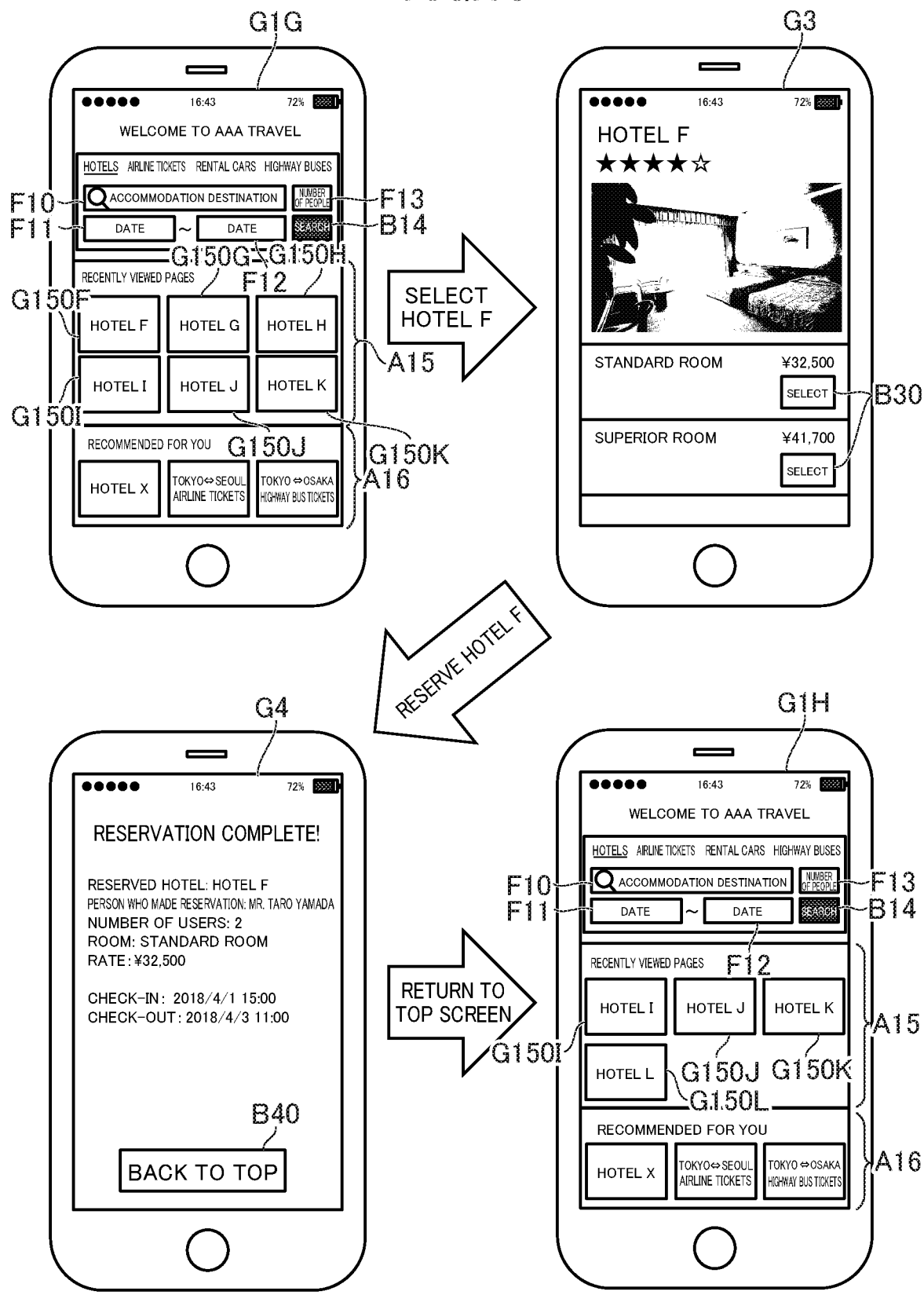
FIG. 13 is a diagram for illustrating how viewed hotels displayed in a display area change before and after a reservation.

FIG. 13 is a diagram for illustrating how the viewed hotels displayed in the display area A15 change before and after a reservation. As illustrated in the top screen G1G of FIG. 13, for example, when the user selects the image G150F of the display area A15, the hotel screen G3 of "Hotel F" represented by the image G150F is displayed. After the user selects the button B30, the information required for a reservation, such as the date of use, the number of users, and guest information, is input, and when the reservation of "Hotel F" is complete, a reservation completion screen G4 is displayed on the display unit 15.

When the user subsequently selects the button B40 and returns to the top screen G1, as illustrated in the display area A15 of the top screen G1H, not only "Hotel F", which has been reserved, but also "Hotel G" and "Hotel H" retrieved based on the same search conditions are also removed. However, "Hotel I", "Hotel J", and "Hotel K" are hotels retrieved based on different search conditions, and hence those hotels remain being displayed in the display area A15. As a result of the removal of "Hotel F", "Hotel G", and "Hotel H" from the display area A15, space is available in the display area A15, and hence "Hotel L" viewed before "Hotel K" is newly displayed in the display area A15.

In this way, in the search system S of the second embodiment, among the viewed hotels, the hotels retrieved based on the same search conditions as those of the reserved hotel are removed from the display area A15, thereby preventing unrequired information from remaining, and enhancing the convenience of the user interface. In the following description, the details of this technology are described.

2-2. Functions to be Implemented in Second Embodiment

Figure 14:
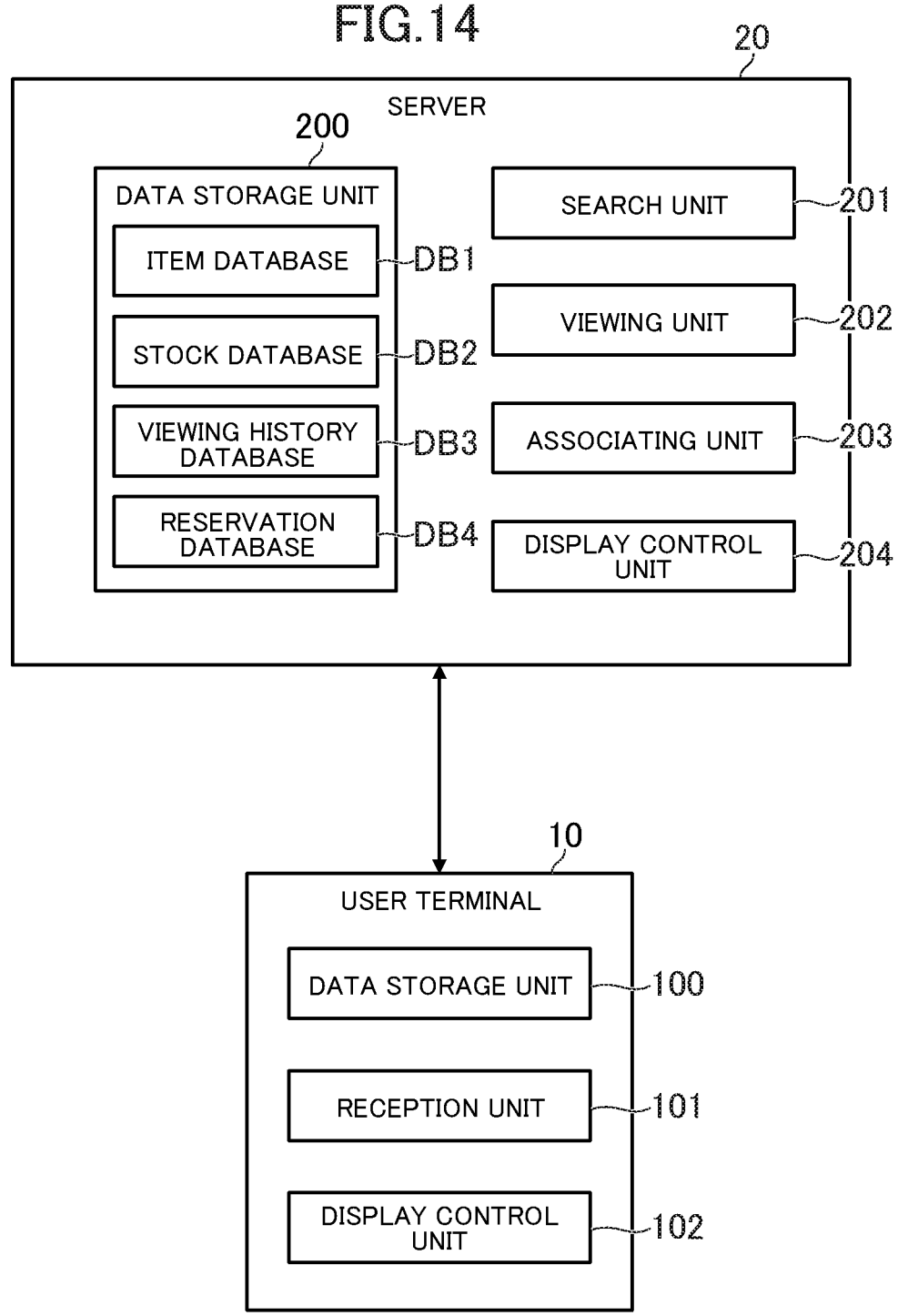
FIG. 14 is a function block diagram for illustrating an example of functions to be implemented by a search system according to the second embodiment.

FIG. 14 is a function block diagram for illustrating an example of the functions to be implemented by the search system S of the second embodiment. In the second embodiment, there is described a case in which the main functions relating to display control are implemented by the server 20, but as in the modification examples described later, the main functions may be implemented by the user terminal 10, or may be shared between the user terminal 10 and the server 20.

As illustrated in FIG. 14, in the second embodiment, similarly to the first embodiment, in the server 20, a data storage unit 200, a search unit 201, a viewing unit 202, an associating unit 203, and a display control unit 204 are implemented. However, a part of the functions is different from those of the first embodiment. There is now described the differences from the first embodiment. The functions of the user terminal 10 are the same as those in the first embodiment.

[Data Storage Unit]

For example, the data storage unit 200 stores an item database DB1, a stock database DB2, a viewing history database DB3, and a reservation database DB4. The item database DB1 and the stock database DB2 are the same as those in the first embodiment, but in the second embodiment, the contents of the viewing history database DB3 are different from those in the first embodiment.

FIG. 15 is a table for showing a data storage example of the viewing history database DB3 in the second embodiment. As shown in FIG. 15, in addition to the information described in the first embodiment, a non-display flag is stored in the viewing history database DB3 in the second embodiment.

The non-display flag is information for indicating whether or not the images G150 representing the viewed hotels are to be displayed. For example, when the non-display flag is a first value (e.g., 0), this indicates that the viewed hotels are to be displayed, and when the non-display flag is a second value (e.g., 1), this indicates that the viewed hotels are not to be displayed. In the following description, switching the non-display flag from the first value to the second value is referred to as "turning on the non-display flag", and switching the non-display flag from the second value to the first value is referred to as "turning off the non-display flag".

In the second embodiment, the reserved hotel and the viewed hotels having the same search conditions as those of the reserved hotel are not displayed in the display area A15. Therefore, the non-display flag can also be said to be information for identifying those hotels. The non-display flag is updated when hotel reservation processing is executed and a record is added to the reservation database DB4, which is described below. For example, the non-display flag is turned on for each of the reserved hotel and the viewed hotels having the same search conditions as those of the reserved hotel. Those non-display flags may be turned off when a predetermined period of time has elapsed.

FIG. 16 is a table for showing a data storage example of the reservation database DB4. As shown in FIG. 16, the reservation database DB4 is a database relating to the hotels reserved by users. For example, the reservation database DB4 stores the user ID of the user who has reserved the hotel, the reservation information, and the reservation completion date and time.

The reservation information is information indicating the content of the reservation, and is, for example, the content input by the user when making a reservation. For example, information such as the hotel ID of the hotel reserved by the user, the room ID of the room reserved by the user, the date of use, and the number of users is stored in the reservation information. The content included in the reservation information is not limited to those examples, and any other content such as guest information may be included, for example.

For example, when the user has not changed the date of use or the number of users after a hotel search is executed, the reservation information contains the same content as that of the search conditions. However, the user can make a reservation by changing the date of use and the number of users after the search, and in this case, the reservation information contains different content from that of the search conditions. When the hotel reservation processing is executed, a new record is added to the reservation database DB4, and the user ID of the user who has made the hotel reservation, the reservation information input when the reservation is made, and the reservation completion date and time are stored in the record. The reservation completion date and time may use the current date and time acquired by a real-time clock or the like.

The user may reserve a hotel by phone or a reservation desk without causing the hotel screen G3 to be displayed, and the reservation result may be added to the reservation database DB4, but in the second embodiment, there is described a case in which the user makes a reservation from the hotel screen G3. For this reason, the hotel reserved by the user is one of the viewed hotels. More specifically, the user reserves any of at least one of the hotels stored in the viewing history database DB3.

[Search Unit/Viewing Unit/Associating Unit]

The search unit 201, the viewing unit 202, and the associating unit 203 are each the same as those in the first embodiment.

[Display Control Unit]

The display control unit 204 controls, when a hotel is reserved by the user, the display of the viewed hotels based on content information on the reservation content and the search conditions associated with the viewed hotels.

The content information is information on the sub-items specified when the user reserves the hotel. The expression "when the user reserves the hotel" refers to a point in time before the record relating to the reserved hotel is added to the reservation database DB4, and may be, for example, any time from when the user inputs the search conditions until before the reservation is confirmed. In the second embodiment, the date of use corresponds to a sub-item, and hence the content information may be the date of use specified by the user, for example, the date of use included in the search conditions, or may be a date of use specified by the user after the search.

For example, the search conditions include a condition relating to each of a plurality of sub-items, such as the place of stay, the date of use, and the number of users, and hence the content information can be said to be information on, of the plurality of sub-items, at least one of the sub-items relating to the reservation content. More specifically, of the above-mentioned three sub-items, the place of stay is only used in the search and has nothing to do with the reservation content specified by the user, and therefore the date of use and the number of users become the content information.

For example, in the case of a hotel reservation, the content information is the date of use or the number of users. In the case of an airline reservation, the content information is the place of departure, the intended destination, the departure date, the departure time, the arrival date, or the arrival time. In the case of a rental car reservation, the content information is the store location, the date of use, the time of use, or the vehicle type. In the case of a bus reservation, the content information is the place of departure, the intended destination, the departure date, or the departure time. In the case of a train reservation, the content information is the place of departure, the intended destination, the departure date, the departure time, the arrival date, or the arrival time. In the case of a restaurant reservation, the content information is the date of use, the number of users, or the menu. In the case of an optional tour reservation, the content information is the date of use or the number of users.

The content information may be the search conditions used in the search for the viewed hotel reserved by the user (i.e., search conditions associated with reserved hotel in viewing history database DB3), or may be the reservation information on the reserved hotel stored in the reservation database DB4.

In the second embodiment, the date of use of the hotel corresponds to a sub-item, and hence there is described a case in which the date of use specified by the user when the user reserves the hotel corresponds to the content information. For this reason, when a hotel is reserved by the user, the display control unit 204 controls the display of the viewed hotels based on the date of use of the hotels and the date of use indicated by the search conditions associated with the viewed hotels.

For example, the display control unit 204 determines whether or not the date of use of the hotel reserved by the user matches the date of use indicated by the search conditions associated with the viewed hotels. The "match" in this case may be a perfect match or a partial match. A partial match means that a part of the period overlaps, for example, in the case of staying consecutive nights at a hotel, a part of the accommodation period overlaps. In the following description, when it is described that the date of use matches, this means that the date of use of the hotel reserved by the user matches the date of use indicated by the search conditions associated with the viewed hotels.

The display control unit 204 controls the display of the viewed hotels based on the determination result as to whether or not the dates of use match. For example, the display control unit 204 does not display in the display area A15 the viewed hotels for which the dates of use match, and displays in the display area A15 the viewed hotels for which the dates of use do not match.

In the second embodiment, turning on the non-display flag of the viewing history database DB3 corresponds to the processing for not displaying the viewed hotels, and turning off the non-display flag (or not changing the value so that the flag remains off) corresponds to the processing of displaying the viewed hotels. In this way, the display control unit 204 turns on the non-display flag of the viewed hotels having a matching date of use, and turns off the non-display flag of the viewed hotels having a non-matching date of use.

In the case of not preparing a non-display flag in particular, the display control unit 204 may control the display of the viewed hotels by determining whether or not the dates of use match each time a display request for the top screen G1 is received from the user terminal 10. For example, the display control unit 204 may perform control such that the viewed hotels are not displayed in the area A15 by deleting the records of the viewed hotels having a matching date of use from the viewing history database DB3, or by saving the records of those viewed hotels in another database.

In the second embodiment, the search conditions stored in the viewing history database DB3 correspond to content information. Therefore, for example, the display control unit 204 controls the display of the viewed hotels based on the search conditions associated with the reserved viewed hotel and the search conditions associated with the other viewed hotels. When a viewed hotel is reserved by the user, the display control unit 204 acquires the search conditions for the reserved viewed hotel stored in the viewing history database DB3, compares those search conditions with the search conditions for the other viewed hotels, and controls the display of those other viewed hotels.

In the second embodiment, the search conditions include conditions relating to a plurality of sub-items. Therefore, for example, the display control unit 204 performs display control based on the date of use of the reserved hotel and a condition relating to at least one sub-item included in the search conditions associated with the viewed hotels. The sub-item to be used may be determined in advance. In the second embodiment, the date of use is used, but a sub-item other than the date of use, for example, the number of users, may be used. In this example, there has been described a case in which the place of stay is not used, but the display control of the viewed items may be performed in consideration of the place of stay as well.

As described above, in the second embodiment, the display control unit 204 identifies viewed hotels that are unusable due to their relationship with the hotel reserved by the user, and performs display control of those identified viewed hotels.

The expression "viewed hotels that are unusable" does not mean that the search system S does not accept a reservation for those hotels, but rather that it is physically impossible to use those hotels. The expression "physically impossible to use" means that it is not possible for the user to move so as to arrive at those hotels. For example, when the date of use of the reserved hotel matches the date of use included in the search conditions associated with a viewed hotel, the viewed hotel is unusable.

In the second embodiment, the search conditions include a condition regarding the date of use for a hotel and the content information indicates the date of use for a reserved hotel, and hence the display control unit 204 identifies the viewed hotels that are unusable based on the date of use of the reserved hotel and the date of use indicated by the search conditions associated with the viewed hotels. For example, the display control unit 204 determines that a viewed hotel cannot be used when the dates of use match.

For example, even when the date of use of the reserved hotel and the date of use included in the search conditions associated with a viewed hotel do not match, the viewed hotel is unusable when there is no time difference sufficient to move between those hotels.

For example, it is assumed that the reserved hotel is located in "Tokyo", the reservation date is "Apr. 1, 2018" to "Apr. 3, 2018", and the check-out is 11:00 on "Apr. 3, 2018". It is also assumed that the viewed hotel is in "New York", with a reservation date of "Apr. 3, 2018" to "Apr. 8, 2018" and a check-in at 15:00 (Japan Time) on "Apr. 3, 2018". In this case, it is not possible to move between Tokyo and New York in 4 hours, and hence, even when the dates of use do not match, the display control unit 204 determines that the viewed hotel is unusable.

In this way, whether or not a hotel can be used may be determined in consideration of not only the date of use but also the location of the hotel (distance between hotels), means of transportation, and the like. For example, the display control unit 204 refers to hotel information in the item database DB1, and identifies the location of the reserved hotel and the location of the viewed hotel. Then, the display control unit 204 acquires an estimated travel time between the hotels based on those locations. The display control unit 204 determines that the viewed hotel can be used when the time difference between the date of use of the reserved hotel and the date of use included in the search conditions associated with the viewed hotel is longer than the estimated travel time. When it is determined that the time difference is shorter than the estimated travel time, it is determined that the viewed hotel is unusable.

The data required to calculate the estimated travel time may be stored in the data storage unit 200 in advance. For example, a relationship between a combination of the location of the reserved hotel and the location of the viewed hotel and the estimated travel time may be prepared as data in the form of a mathematical expression or a table. For example, latitude and longitude information on the hotels may be stored in the hotel information in the item database DB1, and a relationship between a distance calculated based on the latitude and longitude information on the reserved hotel and the latitude and longitude information on the viewed hotel and the estimated travel time may be prepared as data in the form of a mathematical expression or a table.

The search system S receives a display request for the viewed hotels (e.g., display request for top screen G1) from the user terminal 10. Therefore, for example, the display control unit 204 may execute in advance, before the display request is received from the user terminal 10, preparation processing for display control of the viewed hotels, and perform display control based on the execution result of the preparation processing when the display request is received from the user terminal 10.

The preparation processing is, for example, processing of determining whether or not to display a viewed hotel. In the second embodiment, the preparation processing is the setting processing for the non-display flag. The display control unit 204 executes the setting processing for the non-display flag in advance before the server 20 requests the display of the viewed hotels. The setting processing for the non-display flag is as described above. When it is determined whether or not the viewed hotel is to be displayed based on information other than the non-display flag, the preparation processing is processing of setting the information.

In this way, the display control unit 204 restricts the display of a viewed hotel when the search conditions including content corresponding to the content information are associated with the viewed hotel. The expression "content corresponding to the content information" refers to content including search conditions matching the value of the sub-item indicated by the content information. In the second embodiment, the date of use corresponds to a sub-item, and hence a match in the date of use corresponds to inclusion of content corresponding to the content information.

Restricting the display of a viewed hotel may be performed by, for example, not displaying the viewed hotel (i.e., prohibiting display), or lowering a display priority of the viewed hotel (lowering the order). Restricting the display may also be performed by, for example, reducing the size of the image G150 of the viewed hotel, reducing the brightness of the image G150, or changing the color by graying out the image G150 or the like.

2-3. Processing to be Executed in Second Embodiment

The processing to be executed in the second embodiment is generally the same as that in the first embodiment, and the processing of FIG. 10 is executed in the second embodiment. However, the details of the processing of Step S2 and the processing of Step S16 are different from those in the first embodiment.

For example, in the second embodiment, when the processing of Step S2 starts, in Step S20 of FIG. 11, the control unit 21 refers to n most recent records having a non-display flag that is off from among the records of the viewing history database DB3. That is, in the second embodiment, the record having a non-display flag that is on is not a record to be acquired in Step S2. For this reason, the image G150 of hotels corresponding to records in which the non-display flag is on is not displayed in the display area A15. The subsequent processing of Step S21 to Step S29 is the same as that in the first embodiment.

Figure 17:
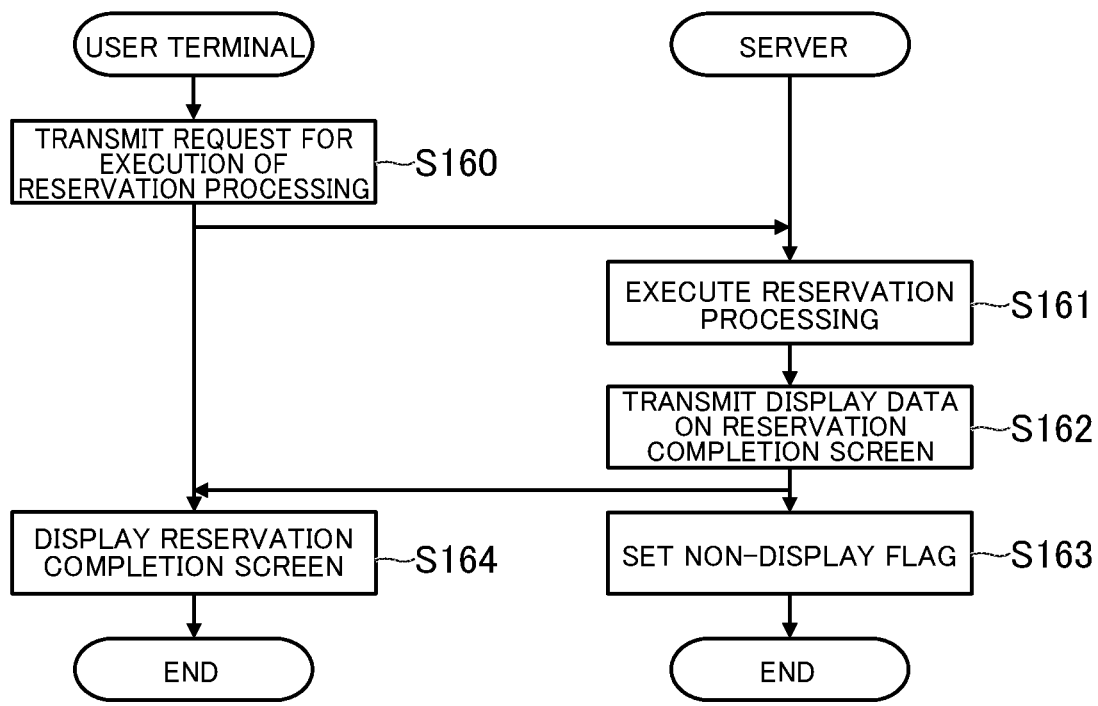
FIG. 17 is a flowchart for illustrating details of processing of Step S16 in the second embodiment.

FIG. 17 is a flowchart for illustrating details the processing of Step S16 in the second embodiment. As illustrated in FIG. 17, in the user terminal 10, the control unit 11 transmits to the server 20, based on a detection signal obtained by the operation unit 14, a request to execute reservation processing (Step S160). The execution request may be issued when data having a predetermined format is transmitted. The execution request includes, for example, reservation information stored in the reservation database DB4, such as the date of use, the number of users, the names of the users, and contact information. Those pieces of information may be input from the operation unit 14 or may be acquired by holding in the storage unit 12 the search conditions input at the time of the search.

In the server 20, when the execution request is received, the control unit 21 executes the reservation processing based on the reservation database DB4 (Step S161). In Step S161, the control unit 21 creates a new record in the reservation database DB4, and stores in the record the user ID of the user who issued the execution request, the reservation information included in the execution request, and the reservation completion time. The control unit 21 then refers to the stock database DB2, and reduces the number of remaining rooms of the hotel room reserved by the user.

The control unit 21 generates display data on the reservation completion screen G4, and transmits the display data to the user terminal 10 (Step S162). The display data on the reservation completion screen G4 may also be generated based on the reservation information.

The control unit 21 sets the non-display flag based on the viewing history database DB3 (Step S163). In Step S163, the control unit 21 identifies the record in which the hotel ID of the hotel reserved by the user is stored from among the records of the viewing history database DB3, and acquires the search conditions included in the record. Then, the control unit 21 identifies a record in which the search conditions matching the acquired search conditions is stored from among the records of the viewing history database DB3, and turns on the non-display flag of the record. The initial value of the non-display flag is off, and the non-display flags of other records remain off.

In the user terminal 10, when the display data is received, the control unit 11 displays the reservation completion screen G4 on the display unit 15 (Step S164), and ends the processing. When the user selects the button B40, the processing of Step S1 is executed again, and a display request for the top screen G1 is transmitted. In this example, the processing of Step S163 (example of preparation processing) is executed in advance, and hence, in the subsequently-executed Step S2, viewed hotels for which the non-display flag has been turned on in the processing of Step S16 are not displayed in the display area A15.

With the search system S of the second embodiment, when a hotel is reserved by the user, the display of the viewed hotels is controlled based on the content information on the reservation content and the search conditions associated with the viewed hotels. The viewed hotels are not just displayed in a list, and the display of the viewed hotels is influenced by the content information and the search conditions. Therefore, the convenience of the user interface can be enhanced. For example, for viewed hotels including in the search conditions a date of use that matches the date of use of the reserved hotel, there is a high likelihood that those viewed hotels are unrequired information for the user, and hence the provision of such unrequired information to the user can be prevented. In the case of not displaying the images G150 of unrequired viewed hotels, unrequired processing, for example, arranging those images G150 in the display area A15, is not performed, thereby enabling the processing load of the server 20 to be reduced. Further, the display data being transmitted over the network is reduced, and hence the communication load can also be reduced.

When a viewed hotel is reserved, the display of the viewed items is controlled based on the search conditions associated with the reserved hotel and the search conditions associated with the viewed hotels. As a result, it is possible to prevent viewed hotels for which a part or all of the search conditions are the same from being displayed, and the convenience of the user interface can be effectively enhanced. Those search conditions are not stored in separate databases, but are stored in the same viewing history database DB3. As a result of reducing the number of databases to be referenced for display control, the speed of the display control processing can be increased, and the processing load of the server 20 can be reduced.

Among the plurality of conditions included in the search conditions, unrequired information can be identified more accurately by using specific conditions in the display control, such as the date of use and the number of users, and hence it is possible to effectively enhance the convenience of the user interface. When a part of the plurality of conditions are used in the display control, the number of conditions used for display control can be reduced, the speed of the display control processing can be increased, and the processing load of server 20 can be reduced.

As a result of identifying the viewed hotels that are unusable due to their relationship with the reserved hotel, and performing display control of those identified viewed hotels, the viewed hotels that are unusable can be prevented from being displayed, and the convenience of the user interface can be effectively enhanced.

As a result of identifying the unusable viewed hotels based on the date of use of the reserved hotel and the date of use of the viewed hotels, the display of viewed hotel that are unusable due to a temporal relationship can be prevented, and the convenience of the user interface can be effectively enhanced.

Through executing the setting processing for the non-display flag in advance before the display request for the top screen G1 is received from the user terminal 10, and performing the display control of the viewed hotels based on the non-display flag set in advance when the display request is received from the user terminal 10, the speed of the display control processing can be increased, and the processing load on the server 20 can be reduced. For example, when the unrequired viewed hotels are to be identified after the display request is received, it takes time to display the top screen G1 after the display request is issued. For example, when display requests from a large number of users are received all at once, the processing load on the server 20 increases. In terms of this point, the search system S can simplify the processing after receiving the display requests by setting the non-display flag in advance, and hence it is possible to reduce the time taken until the top screen G1 is displayed after the display request is issued, to thereby reduce the processing load on the server 20.

The display of the viewed hotels associated with the search conditions including content corresponding to the content information on the reservation content of the reserved hotel can be restricted, and unrequired information can be prevented from being provided to the user. Thus, the convenience of the user interface can be effectively enhanced.

When a viewed hotel displayed in the display area A15 is selected by the user, the hotel screen G3 of the viewed hotel is displayed based on the search conditions associated with the viewed hotel, and the time and effort involved with inputting the search conditions again can be saved. Thus, the operation load on the user can be reduced.

3. Modification Examples

The present invention is not limited to the embodiments described above, and can be modified suitably without departing from the spirit of the present invention.

3-1. Modification Examples of First Embodiment

Figure 18:
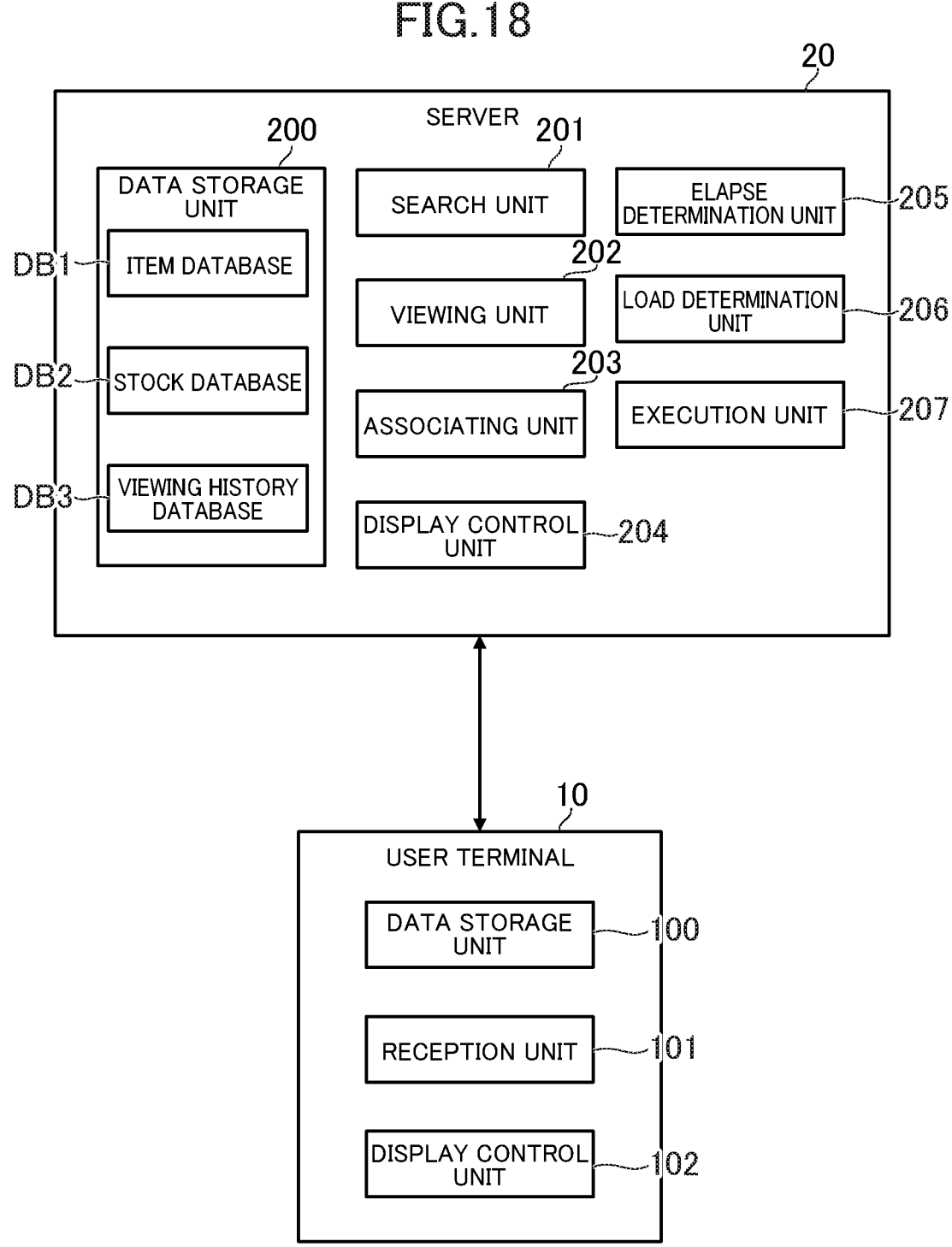
FIG. 18 is a function block diagram in modification examples of the first embodiment.

There are now described modification examples of the first embodiment. FIG. 18 is a function block diagram of the modification examples of the first embodiment. As illustrated in FIG. 18, in the modification examples of the first embodiment, in addition to the functions described in the first embodiment, an elapse determination unit 205, a load determination unit 206, and an execution unit 207 are implemented. The elapse determination unit 205, the load determination unit 206, and the execution unit 207 are an example of elapse determination means, load determination means, and execution means, respectively.

(1-1) For example, in the first embodiment, there is described a case in which a message M151 is displayed on an image G150 when there is no stock of a viewed hotel, but for viewed hotels without stock, the image G150 per se may not be displayed in the display area A15. In other words, only the images G150 of viewed hotels with stock may be displayed in the display area A15.

Figure 19:
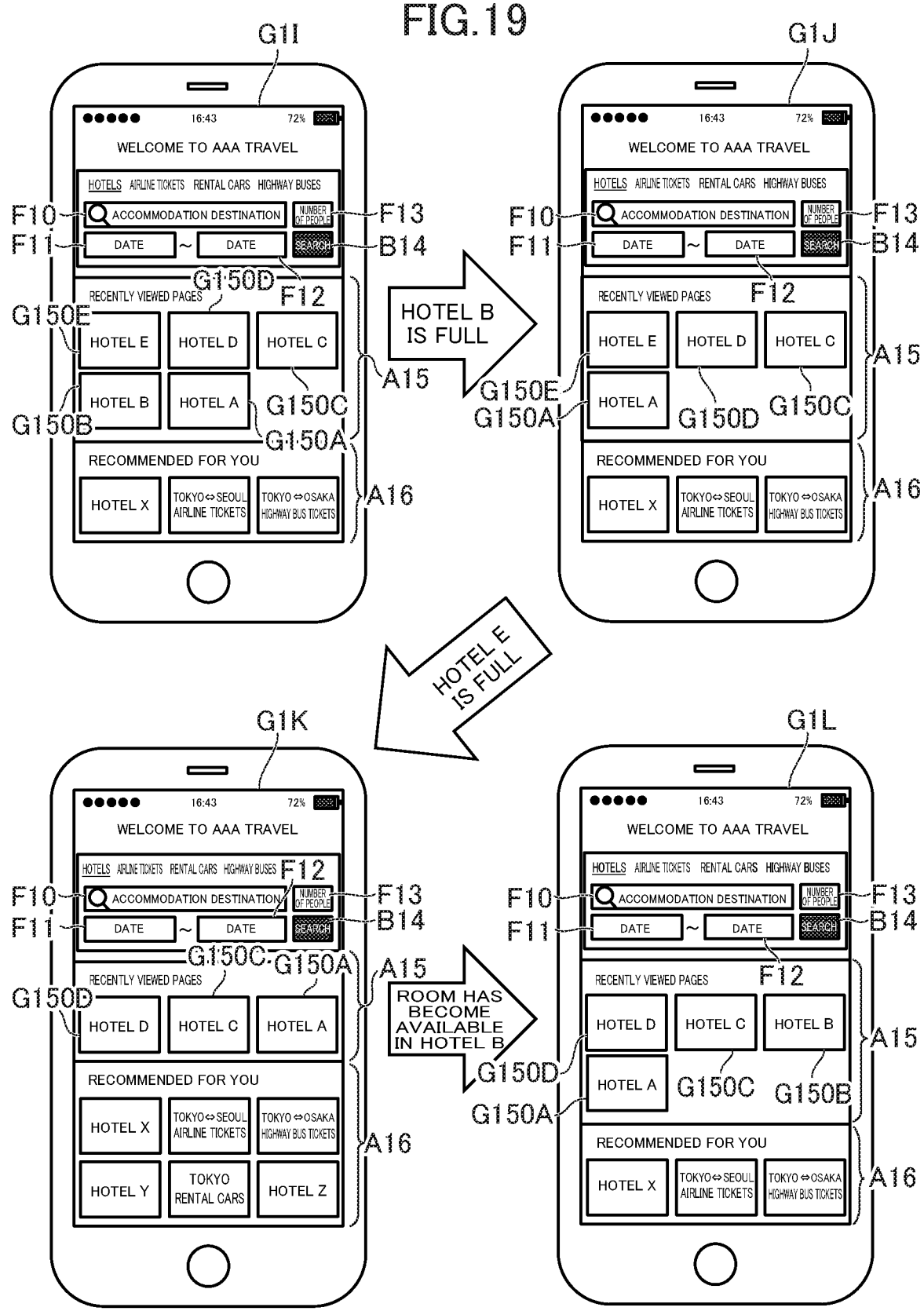
FIG. 19 is a diagram for illustrating an example of changes of the top screen in Modification Example (1-1).

FIG. 19 is a diagram for illustrating an example of changes of the top screen G1 in Modification Example (1-1). A top screen G1I of FIG. 19 is the same as the top screen G1C of FIG. 5 in the first embodiment. From this state, for example, when there are no longer remaining rooms for "Hotel B", as shown in the top screen G1J, the image G150B of "Hotel B" is removed from the display area A15. The expression "there are no longer remaining rooms" means that there are no rooms remaining based on the search conditions at the time of the search. This point is the same in the following description.

Subsequently, when there are no longer remaining rooms for "Hotel E", as shown in the top screen G1K, the image G150E of "Hotel E" is removed from the display area A15. Then, when a remaining room becomes available due to a cancellation for "Hotel B", as shown in the top screen G1L, the image G150B of "Hotel B" is again displayed in the display area A15.

The display control unit 204 in Modification Example (1-1) avoids displaying the viewed hotels when there is no stock for the date of use satisfying the search conditions associated with the viewed hotels, and displays the viewed hotels when there is stock for the date of use satisfying the search conditions associated with the viewed hotels. The expression "avoid displaying the viewed hotels" means avoiding displaying the images G150 representing the viewed hotels in the display area A15, or avoiding transmitting the images G150 representing the viewed hotels to the user terminal 10.

For example, the display control unit 204 displays on the display unit 15 the top screen G1, which includes the images G150 representing the viewed hotels with stock but does not include the images G150 representing the viewed hotels without stock. In other words, the display control unit 204 excludes the viewed hotels without stock from the display in the display area A15, and displays the viewed hotels with stock in the display area A15.

According to Modification Example (1-1), in the display area A15 of the top screen G1, the viewed hotels without stock are not displayed and the viewed hotels with stock are displayed, and hence it is possible to enable the user to grasp the presence or absence of stock of the viewed hotels based on the presence or absence of the display of the viewed hotels in the display area A15. As a result, the convenience of the user interface can be effectively enhanced. Further, the viewed hotels without stock are not displayed, and hence it is possible to more effectively prevent a situation in which a viewed hotel without stock is selected from the display area A15 and a reservation cannot be made even though the hotel screen G3 is displayed.

(1-2) For example, after the stock of a viewed hotel has run out, when there is a cancellation for the viewed hotel, resulting in a room becoming available for the date of use input at the time of the search, the viewed hotel may be preferentially displayed in the display area A15.

Figure 20:
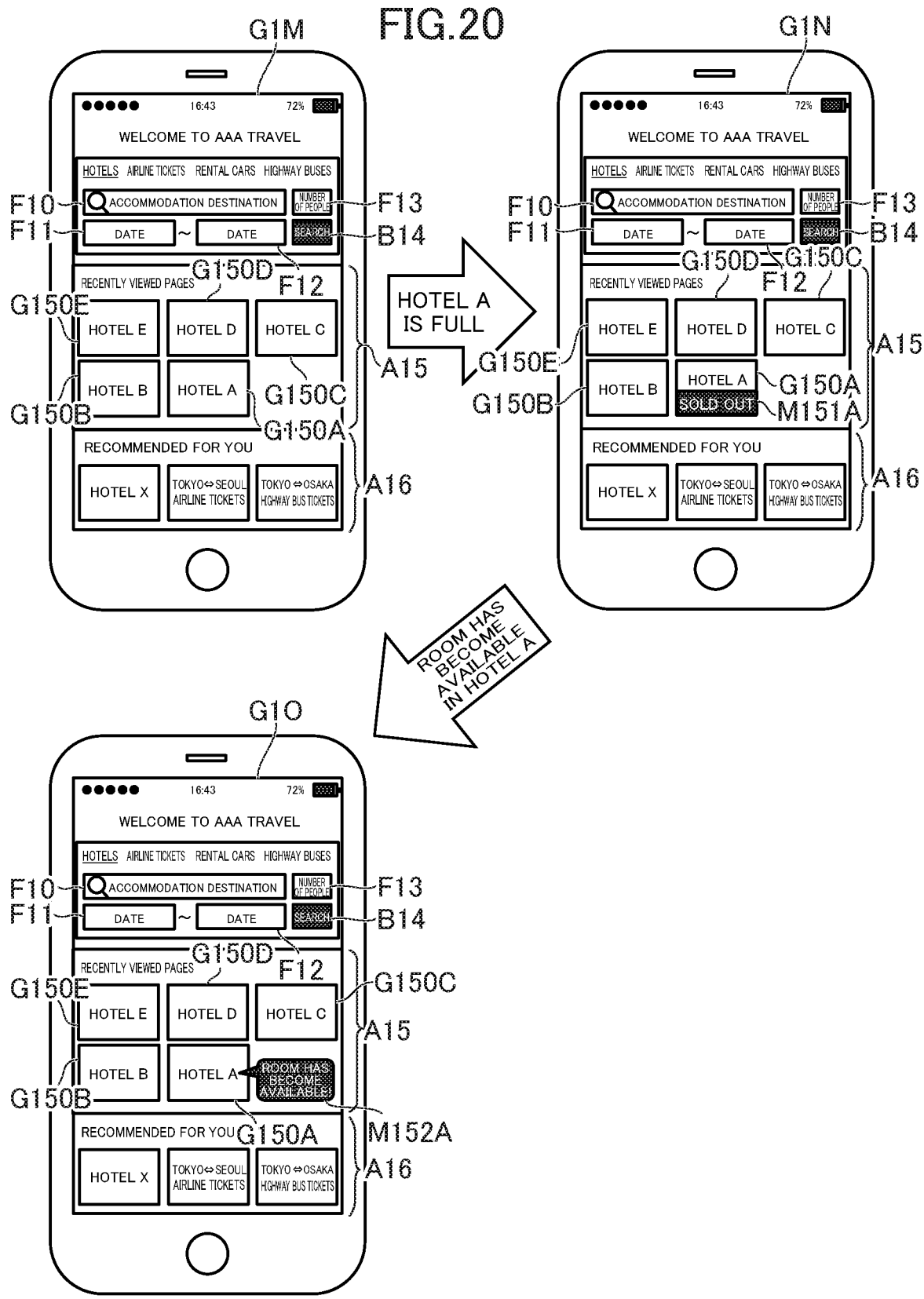
FIG. 20 is a diagram for illustrating an example of changes of the top screen in Modification Example (1-2).

FIG. 20 is a diagram for illustrating an example of changes of the top screen G1 in Modification Example (1-2). A top screen G1M of FIG. 20 is the same as the top screen G1C of FIG. 5 and the top screen G1I of FIG. 19. From this state, for example, when there are no longer remaining rooms for "Hotel A", as shown on the top screen G1N, a message M151A such as "SOLD OUT" is displayed on the image G150A of "Hotel A", to thereby notify the user that there are no longer remaining rooms. In place of displaying the message M151A, the image G150A of the "hotel A" may be removed from the display area A15 as in Modification Example (1-1).

Subsequently, when a room becomes available for the date of use input at the time of the search due to a cancellation for "Hotel A", as shown on the top screen G1O, a message M152A indicating that stock has become available is displayed. For example, the message M152A is displayed so as to indicate the image G150A of "Hotel A". The message M152A is an image for preferentially displaying the image G150A. For example, the message M152A may be displayed on the image G150A, or may be displayed as a part of the image G150A.

The display control unit 204 in Modification Example (1-2) preferentially displays a viewed hotel when a state in which there is no stock for the date of use satisfying the search conditions associated with the viewed hotel is changed to a state in which there is stock. The information indicating the determination result of the presence or absence of stock is stored in the viewing history database DB3. The display control unit 204 determines, based on the information, whether or not a state in which there is no stock has been changed to a state in which there is stock.

The change from a state in which there is no stock to a state in which there is stock means that stock has been returned, the stock quantity has changed from a state smaller than a threshold value to a state equal to or larger than the threshold value, or stock has been determined to be present after a determination that there is no stock. The display control unit 204 determines that a state in which there is no stock has been changed to a state in which there is stock when, after the stock of a viewed hotel becomes smaller than a threshold value (e.g., 1), the stock then becomes equal to or larger than the threshold value.

The "preferential display" means displaying the image G150 in a preferential manner. In other words, the preferential display can also be called a highlighted display, which causes the image G150 to stand out. For example, displaying another image (e.g., message M152 or predetermined icon) in association with the image G150, and changing the display mode or the display position, are examples of the preferential display.

For example, the display control unit 204 preferentially displays the image G150 by displaying the message M152 in association with the image G150. For example, the display control unit 204 may preferentially display the image G150 by increasing the size of the image G150. For example, the display control unit 204 may preferentially display the image G150 by changing the color or pattern of the image G150. For example, the display control unit 204 may preferentially display the image G150 by increasing the brightness of the image G150. Further, for example, the display control unit 204 may preferentially display the image G150 by moving the image G150 to a first position (upper left) of the display area A15.

In Modification Example (1-2), when a state in which there are no remaining rooms of the viewed hotel is changed to a state in which there is a remaining room, through a preferentially display of the viewed hotel, it becomes easier to identify a viewed hotel for which a room has become available, and the convenience of the user interface can be effectively improved.

(1-3) For example, when the date of use used in the search for the viewed hotel has elapsed, it may not be required to determine the presence or absence of stock, and it may not be required to display the image G150 representing the viewed hotel in the display area A15. In other words, in the display area A15, the presence or absence of stock may be determined, or the images G150 may be displayed, for only the images G150 of the viewed hotels for which the date of use used in the search for the viewed hotels has not elapsed.

Figure 21:
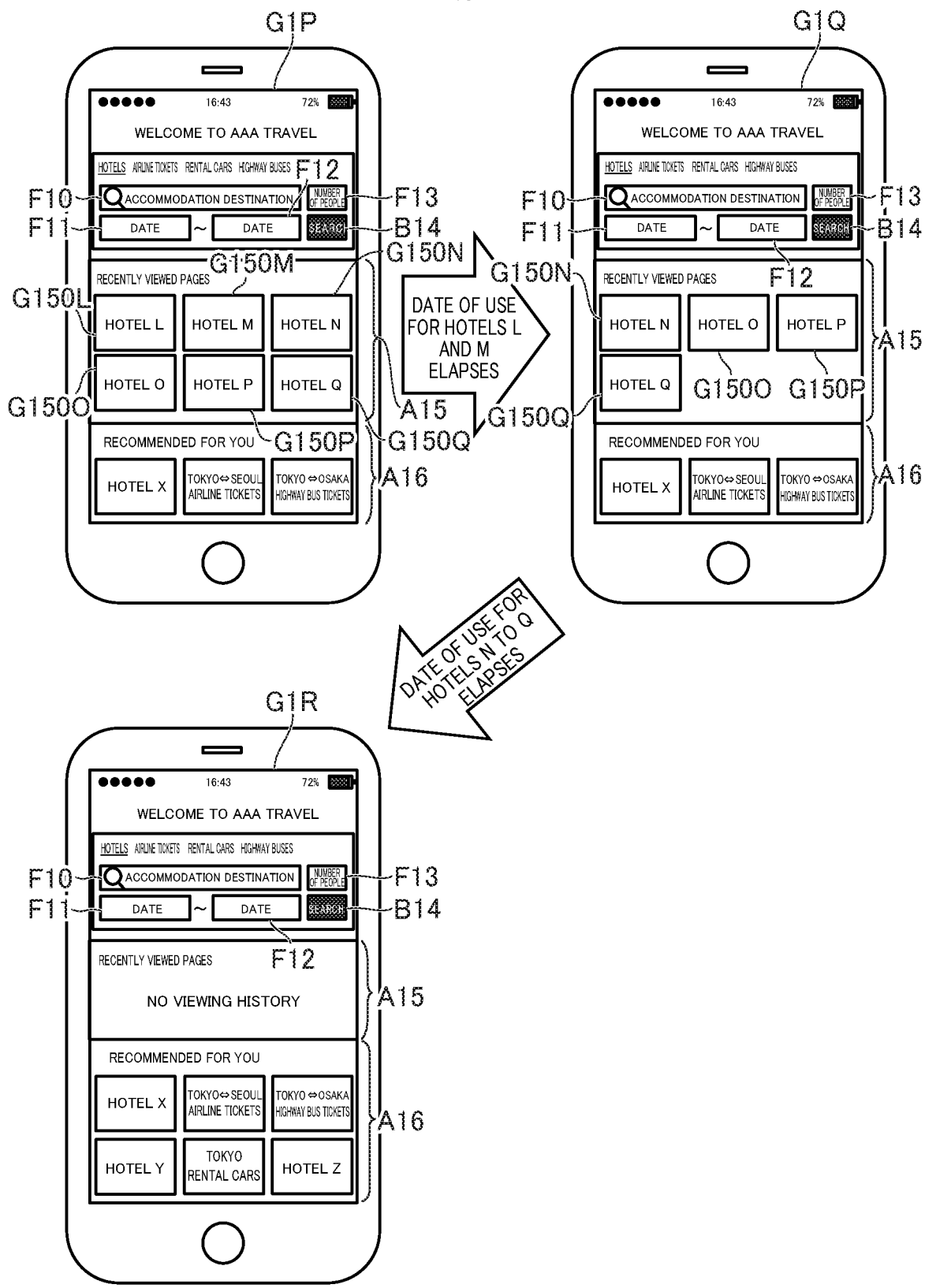
FIG. 21 is a diagram for illustrating an example of changes of the top screen in Modification Example (1-3).

FIG. 21 is a diagram for illustrating an example of changes of the top screen G1 in Modification Example (1-3). In the top screen G1P of FIG. 21, "Hotel L" and "Hotel M" shown in the images G150L and G150M, respectively, are hotels retrieved based on the same date of use as that of a search condition. In this example, the date of use used in the search for those two hotels is "Apr. 1, 2018" to "Apr. 3, 2018".

Meanwhile, "Hotel N", "Hotel O", "Hotel P", and "Hotel Q" shown in images G150N to G150Q, respectively, are hotels retrieved based on the same date of use as that of a search condition. In this example, the date of use used as a search condition for those four hotels is "May 15, 2018" to "May 18, 2018".

For example, when the date of use indicated by the above-mentioned two search conditions has not elapsed in any of the cases, the images G150L and G150M are displayed in the display area A15, as shown on the top screen G1P. When "Apr. 3, 2018", which is the last day of the date of use used in the search for "Hotel L" and "Hotel M", subsequently elapses, as shown on the top screen G1Q, the images G150L and G150 are removed.

When more time elapses, and "May 18, 2018", which is the last day of the date of use used in the search for "Hotel N", "Hotel O", "Hotel P", and "Hotel Q" has elapsed, as shown on the top screen G1R, the images G150N to G150Q are removed.

In this example, there is described a mode in which, when the date of use extends over a plurality of days, the image G150 is removed when the last day of the date of use has elapsed. However, the image G150 may be removed when the first day of the date of use has elapsed. As another example, the image G150 may be removed when any day between the first day and the last day has elapsed.

The search system S of Modification Example (1-3) includes the elapse determination unit 205. The elapse determination unit 205 is implemented mainly by the control unit 21. The elapse determination unit 205 determines whether or not the date of use indicated by the search conditions associated with the viewed hotels has elapsed. The elapse determination unit 205 acquires the current date and time from the real-time clock or the like, and determines whether or not the date of use has elapsed by comparing the current date and time with the date of use indicated by the search conditions associated with the viewed items.

The elapse of the date of use is when the current date and time is later than the date of use. As described above, when the date of use extends over a plurality of days (when date of use is plurality of days instead of one day), the elapse determination unit 205 may determine that the date of use has elapsed when the current date and time is later than the first day, or may determine that the date of use has elapsed when the current date and time is later than the last day. The elapse determination unit 205 may also determine, for example, that the date of use has elapsed when the current date and time is later than any day between the first and last days.

The display control unit 204 performs display control based on the stock information on the date of use satisfying the search conditions associated with the viewed hotels and the determination result obtained by the elapse determination unit 205. For example, the display control unit 204 restricts the display of viewed hotels for which the date of use has elapsed. The meaning of "restriction" is as described in the second embodiment. For example, the display control unit 204 restricts the display of viewed hotels for which the date of use has elapsed, and displays without restriction viewed hotels for which the date of use has not elapsed.

The display control unit 204 may also be configured to not restrict the display of viewed hotels for which the date of use has elapsed, but exclude those viewed hotels from the display control based on stock information. Among the viewed hotels stored in the viewing history database DB3, the display control unit 204 performs display control based on stock information on the viewed hotels for which the date of use indicated by the search conditions has not yet elapsed, and does not perform display control based on stock information on the viewed hotels for which the date of use has elapsed.

In Modification Example (1-3), the display control of the viewed hotels is performed based on the determination result of whether or not the date of use included in the search conditions of the viewed hotel has elapsed, thereby preventing unrequired information on hotels for which the date of use has elapsed from being provided to the user, and hence it is possible to effectively enhance the convenience of the user interface. Through not performing stock determination for unrequired viewed hotels for which the date of use has elapsed, the processing load on the server 20 can be reduced while the speed of the display control processing is increased.

(1-4) For example, when the processing load of the server 20 is high, the display control for notifying the presence or absence of stock of the viewed hotels is put on standby, and when the processing load of the server 20 decreases, the display control may be performed. In this case, when the processing load at the point in time of receiving the display request for the top screen G1 from the user terminal 10 is high, the server 20 may first transmit only the images G150 of the viewed hotels. When the processing load decreases, the server 20 may refer to the stock information, and additionally transmit the message M151 when the stock of the viewed hotels has run out.

The search system S of Modification Example (1-4) includes the load determination unit 206 and the execution unit 207. The load determination unit 206 and the execution unit 207 are each implemented mainly by the control unit 2l. The load determination unit 206 determines whether or not the processing load of the computer including the display control unit 204 is equal to or larger than a threshold value. The computer including the display control unit 204 is a computer implementing the display control unit 204, and is the server 20 in this example.

The load determination unit 206 acquires the processing load of the server 20, and determines whether or not the load is equal to or larger than a threshold value. The processing load may be information on the load of the computer, and may be, for example, a CPU usage rate, a memory usage rate, or a communication amount per unit time. As the method of acquiring such information, various known methods may be used. For example, the CPU usage rate and memory usage rate may be acquired by using a predetermined command (e.g., top command in Linux (trademark)), and the communication amount may be acquired by measuring the amount of data received per unit time.

The threshold value is only required to be a predetermined numerical value. For example, for the CPU usage rate or the memory usage rate, any numerical value of from 50% to 100% may be used as the threshold value. For the communication amount, it is possible to use a numerical value with a data reception amount of about several tens of megabytes per second as the threshold value.

The execution unit 207 causes the display control unit 204 of the server 20 to execute display control based on stock information when it is determined by the load determination unit 206 that the processing load is smaller than the threshold value.

For example, the execution unit 207 causes the display control unit 204 to put on standby the execution of display control based on stock information when it is determined by the load determination unit 206 that the processing load is equal to or larger than the threshold value, and instructs the display control unit 204 to execute display control based on stock information when it is determined by the load determination unit 206 that the load is not equal to or larger than the threshold value.

In Modification Example (1-4), when it is determined that the processing load of the server 20 is smaller than the threshold value, the processing load of the server 20 can be effectively reduced by executing the display control of the viewed hotels based on the stock information. When only the images G150 of the viewed hotels are transmitted to the user terminal 10 first, and the message M151 indicating the presence or absence of stock is transmitted later, the top screen G1 can be displayed more quickly.

(1-5) For example, when there is no stock at the date of use used in the search of the viewed hotels, among the date of use and the number of users included in the search conditions, the presence or absence of stock may be determined by changing only the date of use, and another date of use with stock may be proposed to the user. As the another date of use, it is preferred to propose a date near the date of use included in the search conditions (e.g., within one day to within several weeks), but when there is no stock near the date of use, the range for determining the presence or absence of stock may be gradually expanded.

Figure 22:
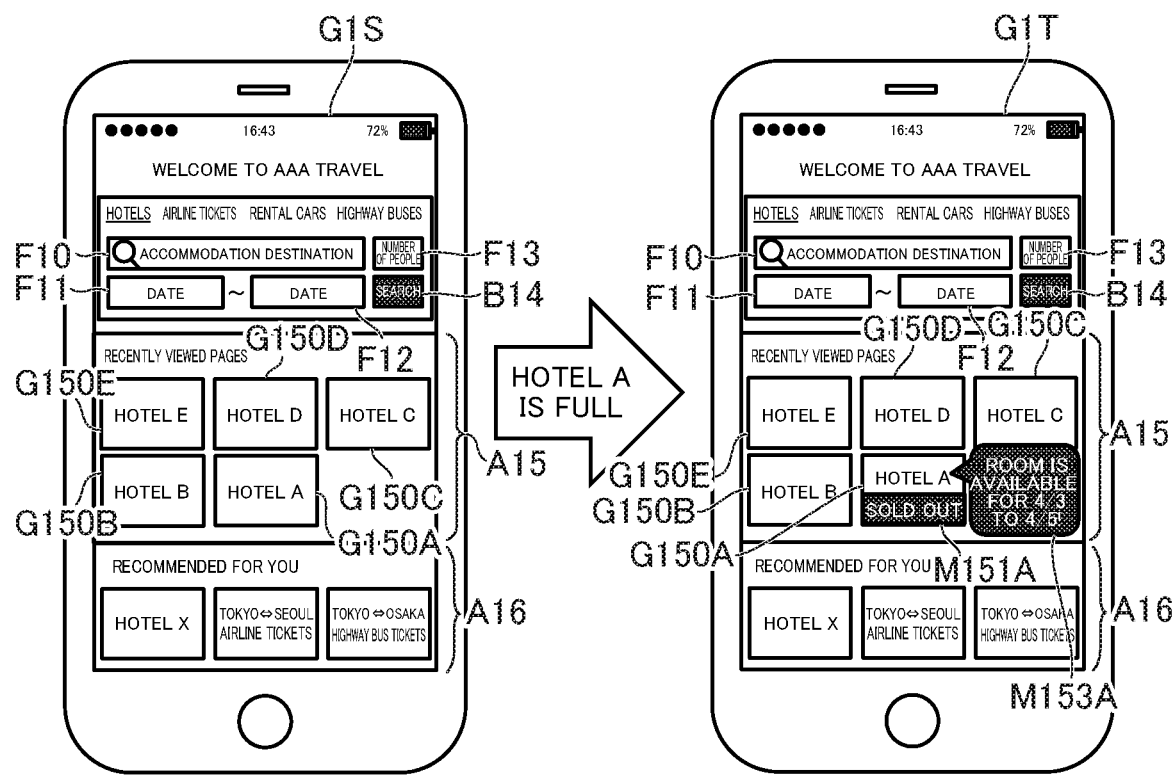
FIG. 22 is a diagram for illustrating an example of changes of the top screen in Modification Example (1-5).

FIG. 22 is a diagram for illustrating an example of changes of the top screen G1 in Modification Example (1-5). A top screen G1S of FIG. 22 is the same as the top screen G1C of FIG. 5, the top screen G1I of FIG. 19, and the top screen G1M of FIG. 19. In this example, there is illustrated a case in which, for example, the date of use used in the search of "Hotel A" to "Hotel E" is "Apr. 1, 2018" to "Apr. 3, 2018".

From this state, for example, when there are no longer remaining rooms for the above-mentioned date of use of "Hotel A", a message M151A such as "SOLD OUT" is displayed on the image G150A of "Hotel A", as shown on the top screen G1T. Meanwhile, when there is a remaining room for another date of use, a message M153A indicating this fact is displayed. For example, when there is a remaining room of "Hotel A" if the travel plan is changed to "Apr. 3, 2018" to "Apr. 5, 2018", the message M153A is displayed.

The display control unit 204 performs display control based on the another date of use with stock when there is no stock indicated by the stock information on the date of use satisfying the search conditions associated with the viewed hotels. For example, when there is no stock indicated by the stock information on the date of use satisfying the search conditions associated with the viewed hotels, the display control unit 204 changes the date of use and determines the presence or absence of stock.

The date of use after the change may be any date different from the original date of use, but in this example, the presence or absence of stock is determined by shifting the date of use by one day. The display control unit 204 may repeat the change of date of use and the determination of the presence or absence of stock until a date of use with stock is found. When a date of use with stock is still not found even by determining the presence or absence of stock for a predetermined number of dates of use, the change of the date of use and the determination of the presence or absence of stock may be ended.

For example, when another date of use with stock is found, the display control unit 204 displays a message M153 indicating the fact. The message M153 may be displayed in association with the image G150. Like in FIG. 22, the message M153 may be displayed so as to indicate the image G150, or may be displayed on the image G150. For example, when another date of use with stock is found, the display control unit 204 may display a message to that effect in the image G150 in place of displaying the message M153.

In Modification Example (1-5), when there are no remaining rooms for the viewed hotels, display control is performed based on another date of use for which there is a remaining room, and hence it is possible to propose another date of use with a remaining room to the user. Therefore, the convenience of the user interface can be effectively enhanced. It is also possible to save the user the time and effort to search again for another date of use for which there is a remaining room. From a perspective of the server 20, the server 20 does not receive a search request from the user over and over again, and it is not required to repeatedly execute search processing. Therefore, the processing load on the server 20 can be reduced, and the communication load can also be reduced because the number of search requests and search results transmitted and received via the network can be reduced.

(1-6) For example, each hotel may be reserved by the user, and hence, by applying the processing in the second embodiment to the first embodiment, viewed hotels having the same search conditions as those of the hotel reserved by the user may be excluded from the determination of the presence or absence of stock. More specifically, among the viewed hotels, the determination of the presence or absence of stock may be performed only for the viewed hotels having different search conditions from those of the reserved hotel, and the determination of the presence or absence of stock is not performed for the viewed hotels having the same search conditions as those of the reserved hotel.

In Modification Example (1-6), the display control unit 204 performs display control based further on the content information on the reservation content of the hotel reserved by the user. In this example, like in the second embodiment, there is described a case in which the search conditions used in the search for the reserved hotel correspond to the content information.

For example, the display control unit 204 acquires the search conditions associated with the reserved hotel based on the viewing history database DB3, and excludes other viewed hotels having the same search conditions as those search conditions from the display control based on stock information. Meanwhile, the display control unit 204 performs display control based on stock information for other viewed hotels having the same search conditions as the search conditions associated with the reserved hotel. The content of the display control is as described in the first embodiment.

In Modification Example (1-6), the display control of the viewed hotels is controlled based on the content information on the reservation content of the reserved hotel. As a result, the viewed hotels are not just displayed in a list, and the display of the viewed hotels is influenced by the content information and the search conditions. Therefore, the convenience of the user interface can be enhanced. For example, for viewed hotels including in the search conditions a date of use that matches the date of use of the reserved hotel, there is a high likelihood that those viewed hotels are unrequired information for the user, and hence the provision of such unrequired information to the user can be prevented. Further, stock determination is not performed for viewed hotels for which such a determination is not required due to their relationship with the reserved hotel, and the viewed hotels for which the stock determination is to be performed can be narrowed down. Thus, it is possible to reduce the processing load of the server 20 while increasing the speed of the display control processing.

(1-7) For example, while the hotel search is performed, the search conditions may be changed due to a change in the user schedule. In this case, there is a possibility that the user is no longer interested in the viewed hotels based on search conditions (old search conditions) different from the changed search conditions, and hence it may not be required to determine the presence or absence of stock for those viewed hotels. More specifically, for the viewed hotels based on search conditions different from the latest search conditions input by the user, it may not be required to determine the presence or absence of stock.

In Modification Example (1-7), the data storage unit 200 stores the search conditions received from the user terminal 10. For example, when the search unit 201 executes a hotel search, the search unit 201 records the search conditions input by the user in the data storage unit 200 in association with the user ID of the user. Only the latest search conditions may be recorded in the data storage unit 200, or the search conditions input by the user may be recorded in time series.

When the search conditions input by the user are changed, the display control unit 204 performs display control based further on the changed search conditions. For example, of the viewed hotels, the display control unit 204 performs display control based on stock information for the viewed hotels having the same search conditions as the latest search conditions, and excludes from the display control based on stock information the viewed hotels having search conditions different from the latest search conditions.

In Modification Example (1-7), when the search conditions are changed, display control is performed based on the changed search conditions, and stock determination that is not required in view of the changed search conditions is not performed, and hence it is possible to narrow down the viewed hotels for which the stock determination is to be performed. As a result, it is possible to reduce the processing load on the server 20 while increasing the speed of the display control processing.

3-2. Modification Examples of Second Embodiment

Figure 23:
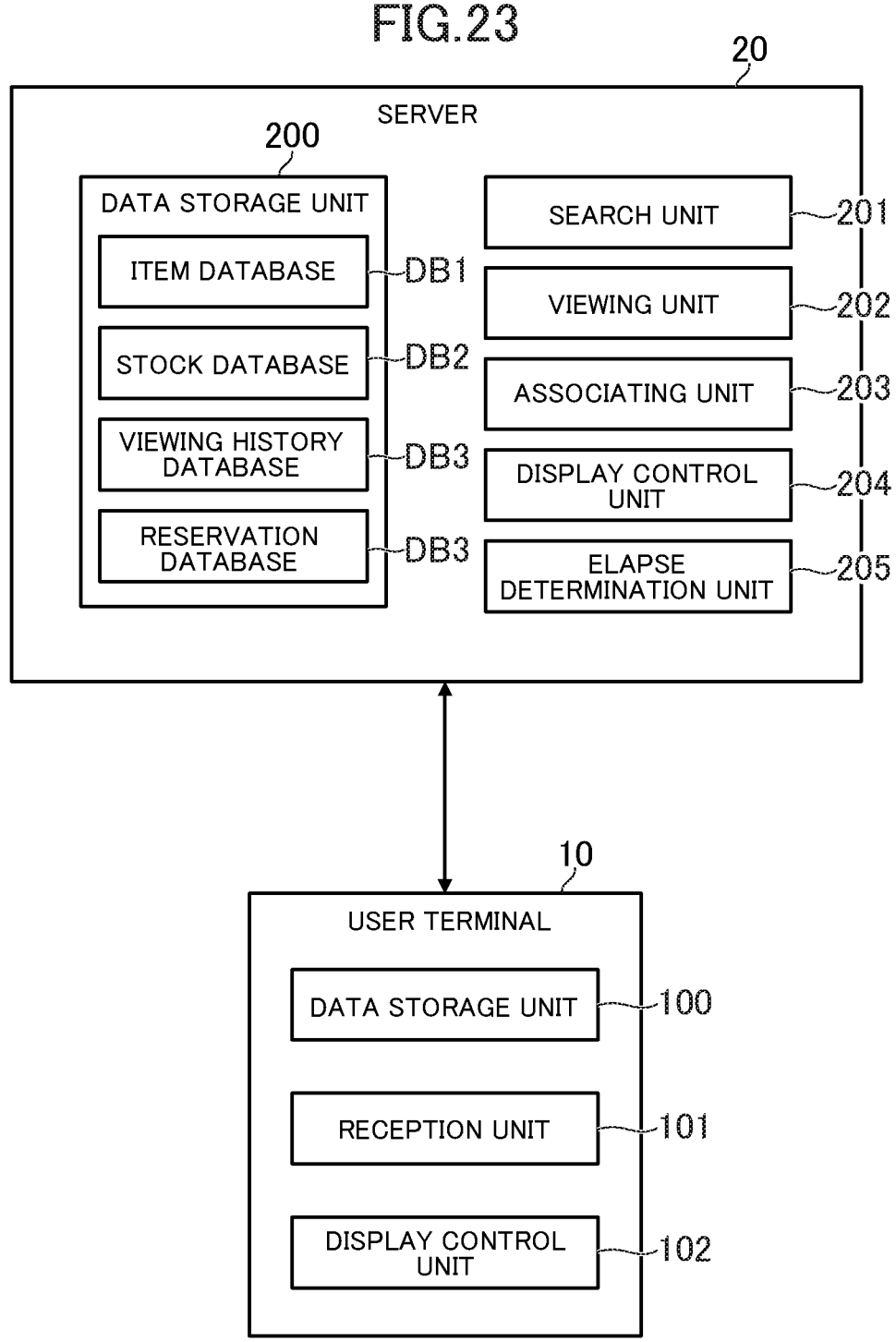
FIG. 23 is a function block diagram in modification examples of the second embodiment.

There is now described modification examples of the second embodiment. FIG. 23 is a function block diagram of the modification examples of the second embodiment. As illustrated in FIG. 23, in the modification examples of the second embodiment, in addition to the functions described in the second embodiment, an elapse determination unit 205 is implemented.

(2-1) For example, in the second embodiment, viewed hotels having the same search conditions as those of the hotel reserved by the user are not displayed in the display area A15, but a viewing history of each of airline tickets, rental cars, or buses may be displayed in the display area A15. The likelihood that the user requires information on those items is higher when the search conditions are the same.

For example, when the user reserves a hotel in "Tokyo" with a date of use of "Apr. 1, 2018" to "Apr. 3, 2018", the user may also reserve an airline ticket, a rental car, or a bus together with the hotel. When the user retrieves and views airline tickets, rental cars, or buses for the date of use, the viewing history of each of those may be preferentially displayed. The meaning of "preferential display" is as described in the modification examples of the first embodiment.

Figure 24:
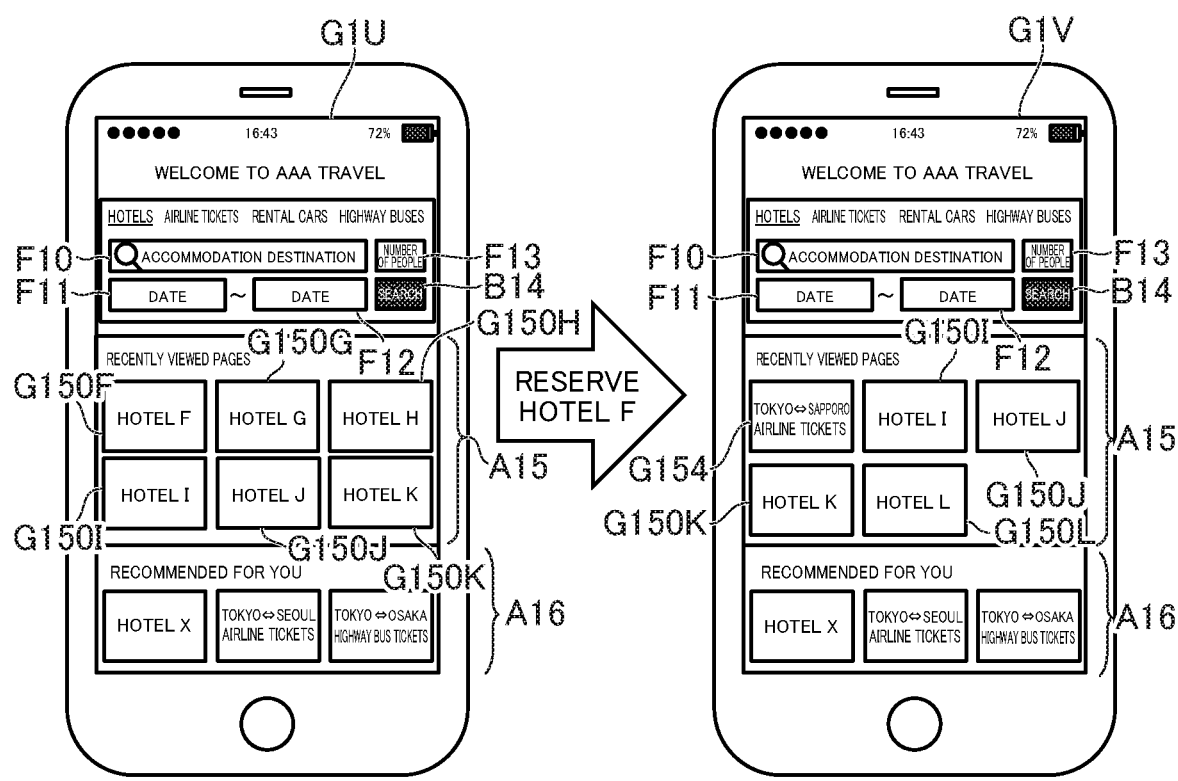
FIG. 24 is a diagram for illustrating an example of changes of the top screen in Modification Example (2-1).

FIG. 24 is a diagram for illustrating an example of changes of the top screen G1 in Modification Example (2-1). The top screen G1U of FIG. 24 is the same as the top screen G1G of FIG. 13. In this state, when the user reserves "Hotel F", as shown on the top screen G1V, "Hotel G" and "Hotel H" having the same search conditions are removed, and an image G154 representing a "Tokyo-Sapporo airline ticket" for which the date of use of the search conditions matches "Hotel F" is preferentially displayed.

For example, the airline ticket represented by the image G154 is an item retrieved when the user input search conditions with "Apr. 1, 2018" as the departure date, "Sapporo" as the place of departure, and "Tokyo" as the place of arrival, and the user then viewed the airline ticket details page. For example, the airline ticket represented by the image G154 may be an item retrieved when the user input search conditions with "Apr. 3, 2018" as the departure date, "Tokyo" as the place of departure, and "Sapporo" as the place of arrival, and then viewed the airline ticket details page. The departure date of this airline ticket matches the date of use of the reserved "Hotel F", and is a date of use for a different type to a hotel (i.e., service for which the provider is different), and hence the departure date is proactively displayed in Modification Example (2-1).

In this example, there is described a case of an airline ticket as an example, but when rental cars or buses are retrieved and viewed by the user based on a date of use or a departure date matching the date of use of "Hotel F" as a search condition, an image of those viewed rental cars or buses may be displayed in the display area A15.

The display control unit 204 in Modification Example (2-1) preferentially displays a viewed item when search conditions including content corresponding to the content information is associated with the viewed item. The meaning of "content corresponding to the content information" is as described in the second embodiment. The display control unit 204 preferentially displays viewed items of a type different from that of the reserved item (i.e., viewed items for which the provider is different from that of the reserved item) when the search conditions including content corresponding to content information are associated with those viewed items.

For example, when search conditions including the date of use matching the date of use of a reserved hotel are associated with a viewed airline ticket, rental car, or bus, the display control unit 204 preferentially displays the viewed airline ticket, rental car, or bus. For example, when search conditions including the date of use matching the departure date or arrival date of a reserved airline ticket are associated with a viewed hotel, rental car, or bus, the display control unit 204 preferentially displays the viewed hotel, rental car, or bus.

For example, when search conditions including the date of use matching the departure date or return date of a reserved rental car are associated with a viewed hotel, airline ticket, or bus, the display control unit 204 preferentially displays the viewed hotel, airline ticket, or bus. For example, when search conditions including the date of use matching the departure date or arrival date of a reserved bus are associated with a viewed hotel, airline ticket, or rental car, the display control unit 204 preferentially displays the viewed hotel, airline ticket, or rental car.

In Modification Example (2-1), a viewed airline ticket or the like associated with search conditions including content corresponding to the content information on the reservation content of the reserved hotel is preferentially displayed. Thus, information useful to the user is provided, and it becomes is easier to reserve the airline ticket. As a result, the convenience of the user interface can be effectively enhanced.

(2-2) For example, in the second embodiment, there is described a case in which the search conditions associated with a hotel reserved by the user correspond to the content information. However, when an item has been reserved or purchased by the user, the content information may be information stored in a database for storing reservation content specified by the user. In this case, the database is the reservation database DB4, but the database may also be another database.

The display control unit 204 in Modification Example (2-2) performs display control based on the content information stored in the reservation database DB4 and the search conditions associated with the viewed items. For example, the display control unit 204 identifies a record in which the user ID of the user who issued the display request for the top screen G1 is stored from among the records of the reservation database DB4, and acquires the reservation information on the record. Then, the display control unit 204 acquires information, such as date of use and the number of users, included in the reservation information as content information. The processing after the content information is acquired is as described in the second embodiment.

In Modification Example (2-2), the display of the viewed items is controlled based on the reservation information on the reserved hotel stored in the reservation database DB4 and the search conditions of the viewed hotels. Even when the reservation content changes after the search conditions are input, unrequired information can be prevented from being provided in accordance with the actual reservation date. As a result, the convenience of the user interface can be effectively improved.

(2-3) For example, when the date of use of the hotel reserved by the user has elapsed, there may be cases in which the user uses a similar hotel by changing only the date of use, and therefore viewed hotels having the same search conditions may be displayed in the display area A15 again.

Figure 25:
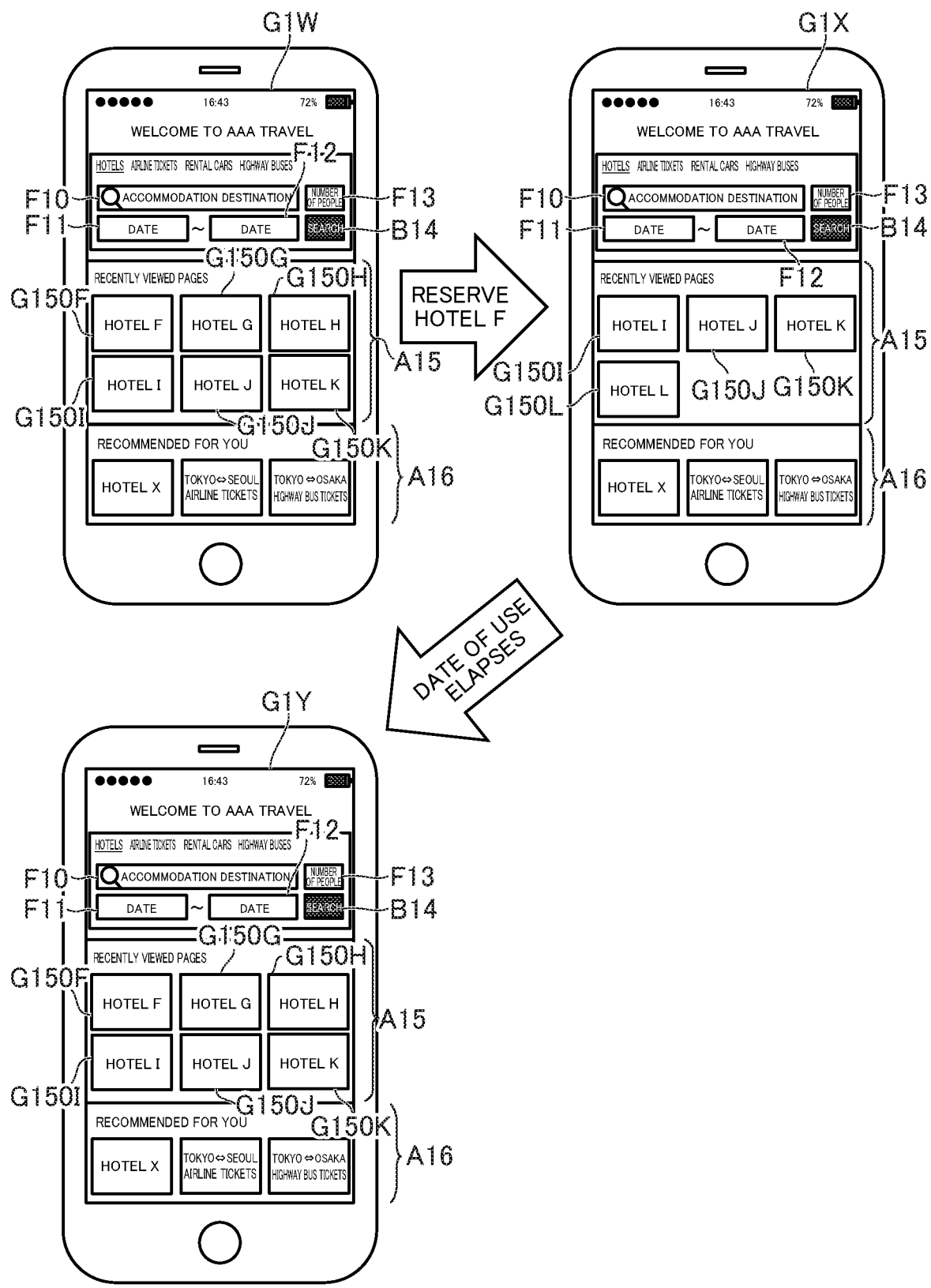
FIG. 25 is a diagram for illustrating an example of changes of the top screen in Modification Example (2-3).

FIG. 25 is a diagram for illustrating an example of changes of the top screen G1 in Modification Example (2-3). The top screen G1W of FIG. 25 is the same as the top screen G1G of FIG. 13 and the top screen G1U of FIG. 24. In this state, when the user reserves "Hotel F", as shown on the top screen G1X, "Hotel G" and "Hotel H" having the same search conditions are removed in the same processing as that in the second embodiment. Subsequently, when the date of use of the "Hotel F" has elapsed, as shown on the top screen G1Y, the images G150F to G150H of "Hotel F", "Hotel G", and "Hotel H" are displayed again.

The search system S in Modification Example (2-3) includes the elapse determination unit 205. The elapse determination unit 205 may have the same function as that in the modification examples of the first embodiment, but in this example, the elapse determination unit 205 determines whether or not at least one of the date of use indicated by the search conditions associated with the viewed hotels and the date of use of the reserved hotel has elapsed. The meaning of "elapse" is as described in the modification examples of the first embodiment. For example, the elapse determination unit 205 determines whether or not the date of use indicated by the search conditions associated with the viewed hotels has elapsed based on the current date and time obtained from a real-time clock or the like, or determines whether or not the date of use of the reserved hotel has elapsed.

The display control unit 204 performs display control based further on the determination result obtained by the elapse determination unit 205. For example, when it is determined by the elapse determination unit 205 that the date of use has not elapsed, the display control unit 204 continues to restrict the display of the viewed hotels, and when it is determined by the elapse determination unit 205 that the date of use has elapsed, the restriction on the display of the viewed hotel is removed, and the viewed hotels are displayed.

In Modification Example (2-3), the display control is performed based on the determination result of whether or not at least one of the date of use of the reserved hotel and the date of use of the viewed hotels has elapsed. As a result, it is possible to prevent the user from being provided with unrequired information for which the date of use has elapsed, and the convenience of the user interface can be effectively enhanced. Through not performing display control on unrequired viewed hotels for which the date of use has elapsed, it is possible to reduce the processing load on the server 20 while increasing the speed of the display control processing.

3-3. Other Modification Examples

For example, the first embodiment and the second embodiment may be combined. Further, for example, the modification examples of the first embodiment and the modification examples of the second embodiment may be combined.

For example, a hotel or the like handled by a travel reservation service is sometimes referred to as "travel product", and thus the reservation of a hotel or the like by a user may correspond to the purchase of a product. In this case, the word "reserve" in the first and second embodiments can be read as "purchase". The items in the search system S are only required to be items that can be reserved or purchased.

There has been described above a case in which the search system S is used mainly in situations of reserving a hotel, but the same processing can also be applied to airline ticket reservations, rental car reservations, bus reservations, train reservations, restaurant reservations, or optional tour reservations. For example, a mixture of the hotels, airlines, rental cars, and buses viewed by the user may be displayed in the display area A15. As another example, the viewing history corresponding to the type of reservation made the top screen G1 may be displayed. For example, when the user makes a hotel reservation, only the viewing history of hotels is displayed, or when the user makes an airline reservation, only the viewing history of airlines is displayed.

For example, when the processing in the first embodiment is applied to an airline ticket reservation, the display of the viewed airline tickets is controlled based on the stock information on the departure date satisfying the search conditions associated with the viewed airline tickets. For example, when the processing in the first embodiment is applied to a rental car reservation, the display of the viewed rental car companies is controlled based on the stock information on the departure date satisfying the search conditions associated with the viewed rental car companies. For example, when the processing in the first embodiment is applied to a bus reservation, the display of the viewed buses is controlled based on the stock information on the departure date satisfying the search conditions associated with the viewed buses.

For example, when the processing in the first embodiment is applied to a train reservation, the display of the viewed trains is controlled based on the stock information on the departure date satisfying the search conditions associated with the viewed trains. For example, when the processing in the first embodiment is applied to a restaurant reservation, the display of the viewed restaurants is controlled based on the stock information on the date of use satisfying the search conditions associated with the viewed restaurants. For example, when the processing in the first embodiment is applied to an optional tour reservation, the display of the viewed optional tours is controlled based on the stock information on the date of use satisfying the search conditions associated with the optional tours.

For example, when the processing in the second embodiment is applied to an airline ticket reservation, the display of the viewed airline tickets is controlled based on the date of use of the reserved airline ticket and the date of use of the viewed airline tickets. For example, when the processing in the second embodiment is applied to a rental car reservation, the display of the viewed rental cars is controlled based on the date of use of the reserved rental car and the date of use of the viewed rental cars. For example, when the processing in the second embodiment is applied to a bus reservation, the display of the viewed buses is controlled based on the date of use of the reserved bus and the date of use of the viewed buses.

For example, when the processing in the second embodiment is applied to a train reservation, the display of the viewed trains is controlled based on the date of use of the reserved train and the date of use of the viewed trains. For example, when the processing in the second embodiment is applied to a restaurant reservation, the display of the viewed restaurants is controlled based on the date of use of the reserved restaurant and the date of use of the viewed restaurants. For example, when the processing in the second embodiment is applied to an optional tour reservation, the display of the viewed tours is controlled based on the date of use of the reserved tour and the date of use of the viewed tours.

There has been described above a case in which the search system. S is used for a travel reservation service, but the search system S may be used in any other services.

For example, when the search system. S is used in electronic commerce, a product corresponds to an item, and information usable as an index of the products corresponds to a sub-item. For example, the sub-items are information on a category of a product, an attribute such as a size or a color of a product, a product title, and a keyword included in a product description. For example, products such as clothing, furniture, and home appliances may have stock information for each attribute such as size and color, and hence, when the processing in the first embodiment is applied to electronic commerce, the display of the viewed products may be controlled based on the stock information on an attribute satisfying the search conditions associated with the viewed products.

For example, when the processing in the second embodiment is applied to electronic commerce, the content information is information on the purchase content. For example, information such as an attribute, a category, a product title, and a product description of the purchased product is an example of the content information. In this case, when a product is purchased by the user, the display control unit 204 controls the display of the viewed products based on the content information on the purchase content and the search conditions associated with the viewed products.

For example, when the product purchased by the user is one of the viewed products, the content information is the search conditions used in the search for the purchased viewed product. For example, the content information is information on, among the plurality of sub-items, at least one sub-item related to the purchase content, and is, for example, an attribute such as the size or the color. When there are products of different sizes or products of different colors, the content information indicates which size of product has been purchased or which color of product has been purchased.

For example, the display control unit 204 may identify products that are not usable due to their relationship with the product purchased by the user, and perform display control of the viewed products that have been identified. For example, the content information may be, when a product is purchased by the user, information stored in a database for storing purchase content specified by the user.

For example, when the search system S is used for ticket sales for a concert, an event, and the like, the ticket corresponds to an item, and information on a performance date, a seat type, or the like that is usable as an index of the ticket corresponds to a sub-item. For example, when the processing in the first embodiment is applied to ticket sales, the display of the viewed tickets may be controlled based on the stock information on the performance date and seat type satisfying the search conditions associated with the viewed tickets (viewed performances). For example, when the processing in the second embodiment is applied to ticket sales, when a ticket is purchased by the user, the display of the viewed tickets may be controlled based on the performance date of the purchased ticket (purchased performance) and the performance date associated with the viewed tickets.

For example, when the search system S is used for a reservation of an event such as a seminar, the event corresponds to an item, and information on the event date that is usable as an index of the event corresponds to a sub-item. For example, when the processing in the first embodiment is applied to event reservation, the display of the viewed events may be controlled based on the stock information (remaining seat information) on the event date satisfying the search conditions associated with the viewed events. For example, when the processing in the second embodiment is applied to event reservation, when an event is reserved by the user, the display of the reserved event may be controlled based on the event date of the reserved event and the event date associated with the viewed events.

For example, the viewing unit 202 may be implemented in the user terminal 10. In this case, the viewing unit 202 is implemented mainly by the control unit 11. The viewing unit 202 receives from the server 20 the display data on the item selected by the user, and enables the item selected by the user to be viewed based on the display data. For example, the processing to be executed by the display control unit 204 may be executed by the display control unit 102 of the user terminal 10. More specifically, the major processing relating to display control may be executed in the user terminal 10. For example, in the first embodiment, the display control unit 102 may receive stock information from the server 20, and display the message M151 or determine whether or not to display the image G150. For example, in the second embodiment, the display control unit 102 may receive content information from the server 20, and control the display of the viewed items.

For example, functions may be shared between the user terminal 10 and the server 20. For example, the viewing unit 202 may be implemented in the user terminal 10, and other functions may be implemented in the server 20. As another example, the display control unit 204 may be implemented in the user terminal 10, and other functions may be implemented in the server 20. As yet another example, the data described as being stored in the data storage unit 200 may be stored by a database server different from the server 20, or may be stored by a database server external to the search system S.

The invention claimed is:

1. A search system for a reservable or purchasable item, the search system comprising at least one processor configured to:
   execute an item search based on a first search condition input by a user to receive first search results;
   display, as a viewed item, a first item that is selected by the user from among the first search results and viewed at a first time;
   record in a storage the viewed first item and the first search condition used in the item search of the first item in association with each other; and
   restrict, when a second item, which is selected by the user among second search results obtained based on a second search condition including a date or time of use, is reserved or purchased by the user at a second time, display of the viewed first item, previously displayed as the viewed item, of which use causes a conflict with reservation or purchase of the second item,
   wherein the at least one processor is further configured to determine the conflict based on content information on reservation content or purchase content of the second item and based on the first search condition, including a date or time of use, associated with the viewed first item, and
   wherein the second search condition is satisfied by search results associated with a first geographic location and a second geographic location and a first future date and a second future date, the second geographic location and the second future date are associated with the second item and with the excluded viewed first item, and the excluded viewed first item is not useable in view of the second future date.

2. The search system according to claim 1,
   wherein the second item reserved or purchased by the user is one viewed item,
   wherein the content information is the second search condition used in a search of the reserved or purchased second item, and
   wherein the at least one processor is configured to control, based on the second search condition associated with the reserved or purchased second item and based on a search condition associated with another viewed item, display of the another viewed item.

3. The search system according to claim 1,
   wherein the second search condition includes a condition regarding each of a plurality of sub-items,
   wherein the content information is information on, of the plurality of sub-items, at least one sub-item relating to the reservation content or purchase content, and
   wherein the at least one processor is configured to perform display control based on the content information and based on a condition regarding at least one sub-item included in the second search condition associated with the reserved or purchased second item.

4. The search system according to claim 1, wherein the at least one processor is configured to identify a viewed third item that is unusable due to a relationship with the second item reserved or purchased by the user, and perform display control of the identified third item.

5. The search system according to claim 4,
   wherein the second search condition includes a condition relating to a date or time of use of an item,
   wherein the content information indicates a date or time of use of the reserved or purchased second item, and
   wherein the at least one processor is configured to identify the unusable third item based on the date or time of use of the reserved or purchased second item and based on the date of use indicated by a search condition associated with the viewed third item.

6. The search system according to claim 1,
   wherein the search system is configured to receive from a user terminal a display request for the viewed first item, and
   wherein the at least one processor is configured to execute, in advance, preparation processing for controlling display of the viewed first item before the display request is received from the user terminal, and when the display request is received from the user terminal, perform display control based on an execution result of the preparation processing.

7. The search system according to claim 1, wherein the at least one processor is configured to preferentially display a viewed fourth item when the viewed fourth item is associated with a search condition, which includes content corresponding to the content information.

8. The search system according to claim 1,
wherein the content information is information stored in a database for storing reservation content or purchase content specified by the user when an item is reserved or purchased by the user, and
wherein the at least one processor is configured to perform display control of the viewed first item based on the content information stored in the database and based on the first search condition associated with the viewed first item.

9. The search system according to claim 1, wherein when a viewed fifth item is selected by the user, the at least one processor enables the viewed fifth item to be viewed based on a search condition associated with the fifth viewed item.

10. The search system according to claim 1,
wherein the second search condition includes a condition relating to a date or time of use of a service relating to the second item,
wherein the content information indicates the date or time of use of the reserved or purchased second item,
wherein the at least one processor is configured to:
determine whether at least one of the date or time of use indicated by the second search condition associated with the viewed item or the date or time of use of the reserved or purchased second item has elapsed, and
perform display control based further on a determination result.

11. The search system according to claim 1, wherein the content information is the second search condition satisfied by search results associated with two different geographic locations.

12. The search system according to claim 1, wherein the second search condition satisfied by search results associated with two different future dates.

13. A search method for a reservable or purchasable item, the search method comprising:
executing an item search based on a first search condition input by a user and receive first search results;
displaying, as a viewed item, a first item that is selected by the user from among the first search results and viewed at a first time;
recording in a storage the viewed first item and the search condition used in the item search of the first item in association with each other; and
restricting, when a second item, which is selected by the user among second search results obtained based on a second search condition including a date or time of use, is reserved or purchased by the user at a second time, display of the viewed first item, previously displayed as the viewed item, of which use causes a conflict with reservation or purchase of the second item,
wherein the restricting comprises determining the conflict based on content information on reservation content or purchase content of the second item and based on the first search condition, including a date or time of use, associated with the viewed first item, and
wherein the second search condition is satisfied by search results associated with a first geographic location and a second geographic location and a first future date and a second future date, the second geographic location and the second future date are associated with the second item and with the excluded viewed first item, and the excluded viewed first item is not useable in view of the second future date.

14. A non-transitory computer-readable information storage medium for storing a program for causing a computer to:
execute an item search based on a first search condition input by a user;
display, as a viewed item, a first item that is selected by the user from among search results and viewed at a first time;
record in a storage the viewed first item and the first search condition used in the item search of the first item in association with each other; and
restrict, when a second item, which is selected by the user among second search results obtained based on a second search condition including a date or time of use, is reserved or purchased by the user at a second time, display of the viewed first item, previously displayed as the viewed item, of which use causes a conflict with reservation or purchase of the second item, and
wherein the program further causes the computer to determine the conflict based on content information on reservation content or purchase content of the second item and based on the first search condition, including a date or time of use, associated with the viewed first item, and wherein the second search condition is satisfied by search results associated with a first geographic location and a second geographic location and a first future date and a second future date, the second geographic location and the second future date are associated with the second item and with the excluded viewed first item, and the excluded viewed first item is not useable in view of the second future date.

* * * * *